US007069571B1

(12) United States Patent
Del Sesto et al.

(10) Patent No.: US 7,069,571 B1
(45) Date of Patent: Jun. 27, 2006

(54) AUTOMATED RETIREMENT OF INTERACTIVE APPLICATIONS USING RETIREMENT INSTRUCTIONS FOR EVENTS AND PROGRAM STATES

(75) Inventors: Eric E. Del Sesto, Alameda, CA (US); James R. Collette, Alameda, CA (US); Jeffrey W. Yu, Alameda, CA (US); Charlie McCullough, Saratoga, CA (US); Pat Ransil, Alameda, CA (US); Bryce S. Catlin, Alameda, CA (US); Houman Azarm, Alameda, CA (US)

(73) Assignee: Wink Communications, Inc., Alameda, CA (US)

(*) Notice: Subject to any disclaimer, the term of this patent is extended or adjusted under 35 U.S.C. 154(b) by 0 days.

(21) Appl. No.: 09/334,131

(22) Filed: Jun. 15, 1999

(51) Int. Cl.
*H04N 9/00* (2006.01)

(52) U.S. Cl. .............................. 725/14; 725/25; 725/32; 725/40; 725/51; 725/61; 725/112; 725/131; 725/139

(58) Field of Classification Search ................... 725/32, 725/36, 61, 25, 28, 132, 152
See application file for complete search history.

(56) References Cited

U.S. PATENT DOCUMENTS

| 4,751,578 A | 6/1988 | Reiter et al. ................. 358/183 |
| 5,307,173 A | 4/1994 | Yuen et al. .................. 358/335 |
| 5,334,975 A | 8/1994 | Wachob et al. ............. 340/825 |
| 5,343,239 A | 8/1994 | Lappington et al. .......... 348/12 |
| 5,400,402 A | 3/1995 | Garfinkle ..................... 380/20 |
| 5,448,568 A | 9/1995 | Delpuch et al. ............ 372/94.2 |
| 5,504,896 A | 4/1996 | Schell et al. ................. 395/650 |
| 5,539,920 A | 7/1996 | Menand et al. ............. 455/5.1 |
| 5,557,317 A | 9/1996 | Nishio et al. ................... 348/7 |
| 5,559,550 A | 9/1996 | Mankovitz |
| 5,563,648 A | 10/1996 | Menand et al. ............... 348/13 |
| 5,583,563 A | 12/1996 | Wanderscheid et al. ...... 348/13 |
| 5,585,858 A | 12/1996 | Harper et al. ............... 348/485 |
| 5,586,264 A | 12/1996 | Belknap et al. ........ 395/200.08 |
| 5,652,615 A | 7/1997 | Bryant et al. ................... 348/9 |
| 5,657,072 A | 8/1997 | Aristides et al. |
| 5,675,373 A | 10/1997 | Joiner et al. .................. 348/13 |

(Continued)

FOREIGN PATENT DOCUMENTS

EP 0 942 595 A2 3/1999

OTHER PUBLICATIONS

Statement from first named inventor.

(Continued)

*Primary Examiner*—Jason Salce
(74) *Attorney, Agent, or Firm*—Schwegman, Lundberg, Woessner & Kluth, P.A.

(57) ABSTRACT

A method and apparatus facilitate the retirement of interactive applications in a manner associated with an external event and a program state of the interactive application. A broadcaster transmits an interactive application that includes a plurality of retirement instructions associated with external events and internal program states of the interactive application. A broadcast receiver receives an interactive application, stores the included retirement instructions, and executes the interactive application concurrently with the display of an associated television program. The broadcast receiver monitors the broadcast signal for events indicating that the executing interactive application is no longer appropriate for the current television program. Upon detection of such an event, the broadcast receiver retrieves the stored instructions, and retires the interactive application in a manner appropriate for both the detected external event and the internal program state of the interactive application, according to the stored instructions.

28 Claims, 12 Drawing Sheets

U.S. PATENT DOCUMENTS

| | | | |
|---|---|---|---|
| 5,689,799 A | 11/1997 | Dougherty et al. | 455/2 |
| 5,719,618 A * | 2/1998 | Park | 725/30 |
| 5,729,279 A | 3/1998 | Fuller | 348/8 |
| 5,768,539 A | 6/1998 | Metz et al. | |
| 5,774,664 A | 6/1998 | Hidary et al. | |
| 5,781,228 A | 7/1998 | Sposato | 348/13 |
| 5,790,198 A | 8/1998 | Roop et al. | |
| 5,818,440 A | 10/1998 | Allibhoy et al. | 345/327 |
| 5,819,034 A | 10/1998 | Joseph et al. | 395/200.31 |
| 5,826,166 A | 10/1998 | Brooks et al. | 455/5.1 |
| 5,835,717 A | 11/1998 | Karlton et al. | 395/200.47 |
| 5,848,352 A | 12/1998 | Dougherty et al. | 455/5.1 |
| 5,850,447 A | 12/1998 | Peyret | |
| 5,861,881 A | 1/1999 | Freeman et al. | |
| 5,872,589 A | 2/1999 | Morales | |
| 5,880,720 A | 3/1999 | Iwafune et al. | 345/327 |
| 5,929,849 A * | 7/1999 | Kikinis | 725/113 |
| 5,931,908 A | 8/1999 | Gerba et al. | |
| 5,937,331 A | 8/1999 | Kalluri et al. | 455/6.1 |
| 5,970,206 A | 10/1999 | Yuen et al. | |
| 5,974,222 A | 10/1999 | Yuen et al. | |
| 6,006,256 A | 12/1999 | Zdepski et al. | 709/217 |
| 6,008,802 A | 12/1999 | Iki et al. | |
| 6,018,768 A | 1/2000 | Ullman et al. | 709/218 |
| 6,021,433 A | 2/2000 | Payne et al. | |
| 6,061,719 A | 5/2000 | Bendinelli et al. | 709/218 |
| 6,064,438 A | 5/2000 | Miller | |
| 6,181,335 B1 * | 1/2001 | Hendricks et al. | 345/723 |
| 6,256,785 B1 | 7/2001 | Klappert et al. | |
| 6,295,647 B1 | 9/2001 | Ramaswamy | 725/116 |

OTHER PUBLICATIONS

Wink Communications, Technical Specification, Subject: 5.2.17 ServerInfo Define, Dec. 31, 1995.

Pending United States patent application, "Automatic Control of Broadcast and Execution of Interactive Applications to Maintain Synchronous Operation With Broadcast Programs," U.S. Appl. No. 09/333,724, filed Jun. 15, 1999.

*Advanced Television Enhancement Forum Specification (ATVEF)*, Version 1.1r26, Feb. 2, 1999, pp. 1-37.

Evain, J.-P., The Multimedia Home Platform—an overview, EBU Technical Department Review—Spring 1998.

* cited by examiner

AUTOMATED RETIREMENT OF INTERACTIVE APPLICATIONS USING RETIREMENT INSTRUCTIONS FOR EVENTS AND PROGRAM STATES

BACKGROUND

1. Field of Invention

The present invention relates generally to systems and methods for retiring interactive television applications and, more particularly, to systems and methods for selectively terminating and suspending such interactive applications in a manner associated with an external event and a program state of the interactive application.

2. Background of the Invention

Traditionally, the broadcast of television programs has been a one way transmission. A broadcaster would transmit a program which would be received and passively utilized by a viewer. More recently, interactive television has become both possible and popular. Utilizing the ample bandwidth of cable, interactive television applications may be transmitted along with the program material. These interactive applications, which are received and executed by a broadcast receiver, such as a set top decoder, are capable of requesting or otherwise gleaning data from the viewer, and delivering that data back to the broadcaster. Interactive applications have a multiplicity of potential uses such as allowing a viewer to order a product that is associated with a specific program, conducting a poll, or gathering statistics on the program selection and watching habits of television viewers. Specific interactive applications that are associated with specific television programs greatly enhance the viewing experience, and enable new and useful marketing opportunities as well.

A serious problem with interactive television as it exists today is orphaned applications. Interactive applications are transmitted by the broadcaster, but they are executed by the broadcast receiver. Individual interactive applications are associated with specific television programs. It is possible for the connection between the broadcaster and the broadcast receiver to be terminated, broken, lost, or otherwise unexpectedly interrupted, for example by a channel change at a video cassette recorder being used as a receiver upstream from the broadcast receiver controlling the interactive applications. When this happens, the interactive application will continue to execute, even though the associated program is no longer present. The same is true when the broadcast program has terminated, has been temporarily suspended, has been disabled, or has otherwise unexpectedly become unavailable. The result is that the interactive application is no longer appropriate for the broadcast program.

For example, suppose a viewer is watching a documentary program about travel in Southeast Asia, and an associated interactive application which allows the viewer to order a relevant travel guide is executing. If the broadcast program concerning travel ends unexpectedly, and a new broadcast program concerning sports begins, it is no longer appropriate for the interactive application which allows the viewer to order the Southeast Asia travel guide to be executing. If the interactive application continues to execute with its associated broadcast program no longer present, there would be a mismatch between the interactive application and the broadcast program, typically leading to confusion or frustration on the part of the user. For example, if the viewer is watching the sports program, but the interactive application which allows the viewer to order the now unrelated travel guide is executing, the viewer will either be frustrated by the presence of the superfluous interactive application, or worse yet, order the travel guide mistakenly thinking that it is associated with the sports broadcast program.

Accordingly, it is desirable to provide a system and method for retiring interactive television applications when they are no longer appropriate for the current television program material. Specifically, it is desirable to provide a system and method for selectively terminating and suspending such interactive applications when the connection between the broadcaster and the receiver has been terminated, broken, lost, or otherwise interrupted, or when the associated television program has terminated, has been temporarily suspended, has been disabled, or has otherwise unexpectedly become unavailable.

It is further desirable for such a system to associate a retirement behavior of an interactive application not only with an external event, such as the end of an associated broadcast program, but additionally with the program state of the interactive application. For example, if a viewer is in the process of ordering a product by filling in information on a form provided by the interactive application (the interactive application is in a specific program state), it is desirable that the retirement of the interactive application be postponed until the ordering process is complete, despite the fact that the associated broadcast program has ended (an external event).

SUMMARY OF THE INVENTION

The present invention solves the problem of orphaned applications by providing a system for selectively retiring interactive applications in a manner associated with an external event and a program state of the interactive application. The present invention facilitates detection by the broadcast receiver of a number of different conditions indicating that the interactive application is no longer appropriate for the broadcast program. For example, the broadcast receiver is able to detect if the connection between the broadcaster and the receiver has been terminated, broken, lost, or otherwise unexpectedly interrupted. When the broadcast receiver detects such a condition, it retires the interactive application in a manner appropriate for both the detected external event and the internal program state of the interactive application.

Additionally, the present invention facilitates the retirement of interactive applications in response to a transmission from the broadcaster, indicating that the program with which the interactive application is associated is about to be terminated or suspended. Such provides for timely retirement of the interactive application by the broadcast receiver.

A system in accordance with the present invention includes a number of broadcast receivers, a broadcaster that is the source of broadcast data including television programs, commercials, and interactive applications, and a broadcast server which maintains a database of interactive applications. The various interactive applications are associated with individual broadcasters, television programs, and commercials. Each interactive application contains instructions on how it is to be retired under various circumstances.

A broadcast signal containing an interactive application and broadcast data is received by any broadcast receiver tuned to the specific channel upon which the interactive application is broadcast. The broadcast receiver decodes the broadcast signal, and stores various information describing the interactive application, including a plurality of retirement instructions associated with external events and internal program states of the interactive application, and codes identifying the interactive application, the transmitting broadcaster, and the associated broadcast server. The broadcast receiver then executes the interactive application. The broadcaster transmits the interactive application with the broadcast program so long as it is appropriate that the application continue to be executed.

The present invention facilitates the retirement of an interactive application when the broadcast receiver detects, without indication from the broadcaster, conditions that indicate that the interactive application is no longer appropriate for the broadcast program material. As the interactive application executes, the broadcast receiver tests to detect certain changes in the broadcast signal indicating that the interactive application is no longer appropriate for the broadcast program. If the broadcast receiver detects such a condition, it reads the retirement instructions associated with the detected external event and the internal program state of the interactive application. The broadcast receiver proceeds to execute the instructions, thereby retiring the interactive application in a manner appropriate for the conditions necessitating the retirement.

Among the changes in the broadcast signal which the broadcast receiver detects are changes of channel upstream from the broadcast receiver, the loss of the receipt of the bandwidth associated with the transmission of the interactive application, change of the identification code of the broadcaster, change of the identification code of the broadcast server, and change of the identification code of the interactive application being executed. Thus, the broadcast receiver is able to determine if, at any point during broadcast, the interactive application is no longer appropriate for the television program, and to retire the interactive application in an appropriate manner when necessary.

Additionally, the present invention allows the broadcast receiver to retire an interactive application in response to a transmitted signal from the broadcaster. When the current broadcast program is nearing its end, the broadcaster transmits a packet of data to the broadcast receiver indicating that the broadcast receiver is to terminate the currently executing interactive application. The broadcast receiver receives the packet, and terminates the interactive application according to the retirement instructions in the packet, such that it is no longer executing after the broadcast program with which it is associated has been terminated. Likewise, when the current broadcast program is about to be temporally suspended, generally to allow for the transmission of commercials, the broadcaster transmits a packet of data to the broadcast receiver instructing it to suspend the currently executing interactive application. The broadcast receiver receives the packet, and suspends the interactive application according to the instructions, such that it is no longer executing after the broadcast program with which it is associated has been suspended.

The present invention also facilitates the retirement of the an interactive application after the expiration of a defined time period. Each interactive application preferably includes the definition of a period of time within a broadcast of an associated television program during which the interactive application may be executed by the broadcast receiver. Each interactive application preferably also includes instructions for retiring the interactive application when the period of time during which the interactive application may be executed has expired. If the period of time during which the interactive application may be executed expires but the interactive application has not been retired, the broadcast receiver retires the interactive application according to the instructions.

DETAILED DESCRIPTION OF THE PREFERRED EMBODIMENT

System Architecture

Figure 1:
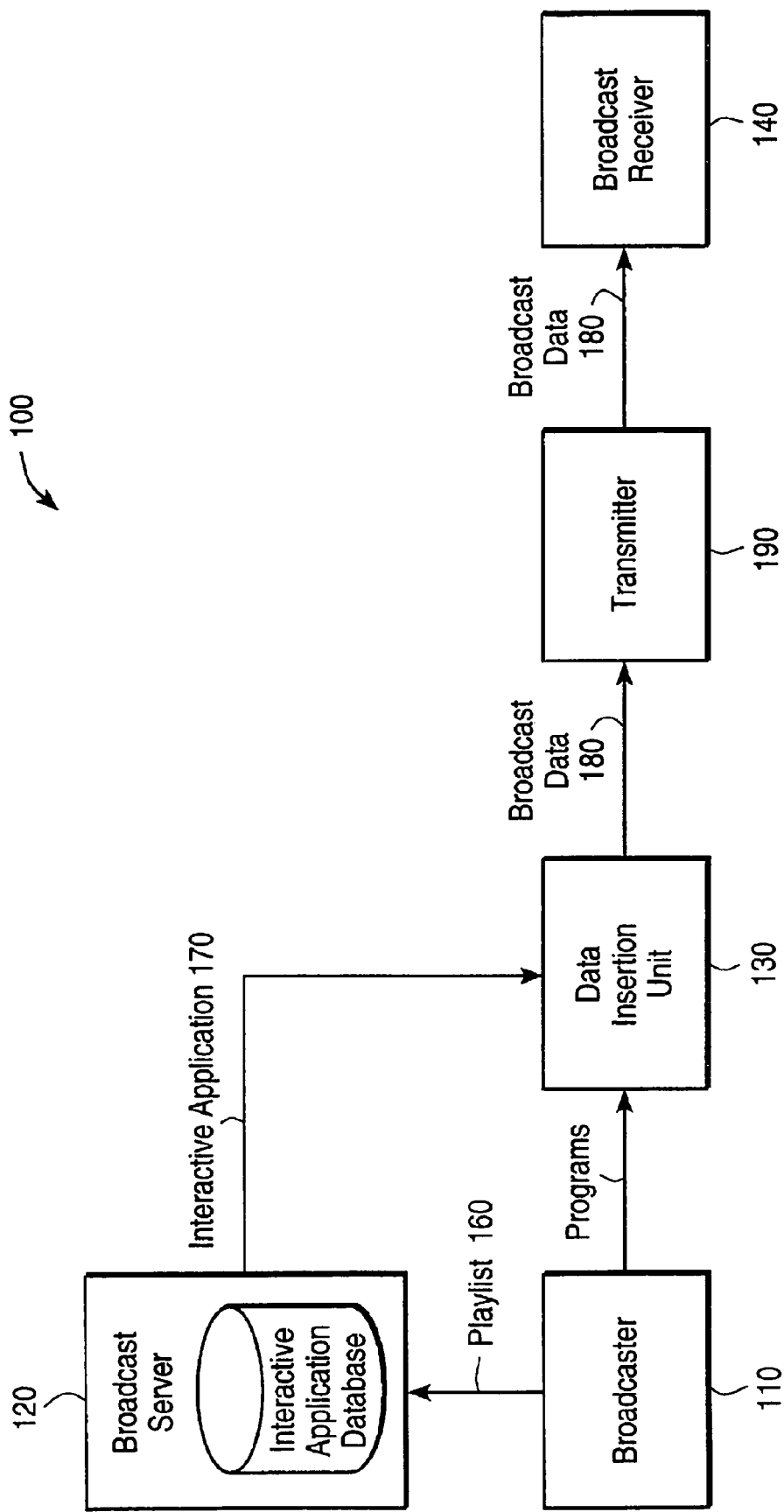
FIG. 1 is a high-level block diagram illustrating a system for performing retirement of interactive applications according to a preferred embodiment of the present invention.

FIG. 1 provides an illustration of the high level system architecture in accordance with the present invention. One skilled in the art will appreciate that the system illustrated in FIG. 1 may be incorporated into larger, more complex systems while still providing the features and benefits of the invention. Generally, system 100 includes a broadcaster 110, a broadcast server 120, a data insertion unit 130, and at least one broadcast receiver (BR) 140.

The broadcaster 110 provides program material to be broadcast to the BR's 140. As used herein, a "broadcaster" 110 is any entity providing a program that will be carried on a broadcast signal. A "program" is a discrete segment of a broadcast. Thus, as defined herein, program includes television shows, commercials, public service announcements, pay-per-view events, and the like. Broadcasters include television networks, as well as advertisers who prepare commercials, pay-per-view providers, cable networks, and the like. A typical broadcaster 110 maintains program sources, such as banks of video cassette players, video disc players, video servers, film, and the like containing program material; automation systems that selectively control the program sources to select which units provide program material at which times; and switching systems controlled by the automation systems which couple the program sources to respective broadcast media for controlling which program sources output to which broadcast media at any given time. In a preferred embodiment of the present invention, each broadcaster has a unique broadcaster identification code. The person or persons receiving the programs are referred to as "subscribers" or "viewers."

The broadcast server 120 is preferably a computer system executing a software program providing the functionality described herein. The broadcast server 120 contains an interactive application database 150 holding interactive applications that will be broadcast to various remotely distributed BR's 140. Interactive applications may be added to the interactive applications database 150 by a broadcaster 110 or other program supplier and may be transmitted to the database 150 by a secure network link or other transmission media. Fields within the database 150 associate interactive applications with, for example, a particular broadcaster, network, channel, program, and/or broadcast time. In addition, each interactive application in the database 150 preferably has a unique application identification code by which it may be identified. Also, each interactive application preferably is associated with defining instructions for retiring the application under various conditions. In one embodiment, these instructions form an application termination protocol record (ATPR). ATPR's are described in detail below.

In one embodiment of the present invention, the interactive applications stored in the database 150 are described by a compact communications protocol. The compact protocol is designed to broadcast a compact set of information and commands among the system components in an efficient manner, thereby allowing the use of low bandwidth transports such as the vertical blanking interval (VBI). While a preferred embodiment of the present invention uses the compact protocol described therein, interactive applications may be described by other protocols, including for example, the Hypertext Markup Language ("HTML") or SUN MICROSYSTEMS INC.'s JAVA language. A detailed description of one compact protocol for interactive applications, including supported definitions, scripts, and commands, is described in U.S. Pat. No. 5,689,799, entitled "Method and Apparatus for Routing Confidential Information," which issued on Nov. 18, 1997 and is hereby incorporated by reference herein.

The interactive applications are themselves software products comprising executable code and data, which configures and controls the operation of a broadcast receiver 140, as further described below. In a preferred embodiment of the present invention, an interactive application is represented as a series of data structures called records, in accordance with the compact communications protocol. In a preferred embodiment of the invention, the records of an application are placed into a single block for broadcast delivery. The block is a flexible packet structure consisting of a header, data portion, and footer. A block can contain one or more records. The header of a block preferably contains several transport-related fields which pertain equally to all of the records contained in the block. Specific examples of data contained in such fields are the application identification code for the application represented by those records, the broadcaster identification code for the broadcaster from which the program originated, the server identification code (described below) for the relevant broadcast server, and a field indicating if the application represented by those records is suspendable (described below).

There may be a plurality of broadcast servers 120, with each broadcast server 120 serving a particular geographic area, set of broadcasters, or set of subscribers. In a preferred embodiment, each broadcast server 120 is identified by a unique server identification code.

Generally, the broadcast server 120 determines which interactive applications should be broadcast on a particular channel at a particular time, retrieves the interactive applications corresponding to the particular channel and time from the database 150, and prepares the interactive applications for broadcast.

To determine which interactive applications are broadcast at the various times, channels, and so forth, the broadcast server 120 receives a playlist 160 of programs to be broadcast by the broadcaster 110. In one embodiment, this playlist 160 is prepared in advance and identifies the programs that will be broadcast by the broadcaster 110 at particular times. In another embodiment, the broadcast server 120 receives the playlist 160 in real-time, identifying the program currently being broadcast by the broadcaster 110, with the playlist 160 being updated as the broadcast changes. In either embodiment, the playlist 160 contains sufficient information to identify each program, its start and end times, the channel and network assignments, or broadcaster identification code. The broadcast server 120 uses this information to identify and retrieve a corresponding interactive application from the database 150 that is to accompany the program.

The broadcast server 120 formats a retrieved interactive application, if necessary, and otherwise prepares it for insertion into a broadcast signal. Using the playlist 160 received from the broadcaster 110, the broadcast server 120 passes the interactive application 170 to the data insertion unit ("DIU") 130 to incorporate the interactive application 170 into the broadcast feed concurrent with the broadcast of the program.

The DIU 130 receives the interactive application 170 from the broadcast server 110 and the broadcast signal, or feed, carrying the program corresponding to the interactive application 170. The broadcast feed may be received from the broadcaster 110, or, in the case where the broadcaster does not provide the feed, from a third party such as a network, cable operator, or local television station. The DIU 130 converts the interactive application 170 into a format suitable for insertion into the broadcaster feed and transmission therewith as broadcast data 180. The DIU 130 may receive feeds from multiple broadcasters and can insert a separate interactive application into each feed. Likewise, the DIU 130 can simultaneously insert a separate interactive application into multiple channels from the same, or different, broadcasters 110.

The DIU 130 inserts the broadcast data 180 containing the interactive applications and broadcast programs into the broadcast medium. The broadcast medium is the frequency spectrum used to carry the interactive application 170. In one embodiment, the broadcast medium is a standard analog television signal following National Television Standards Committee ("NTSC") standards and the VBI is used as a transport to broadcast the interactive application 170. The transport is the specific portion of the broadcast medium which carries the interactive application 170. In another embodiment, the broadcast medium is a standard MPEG2 Digital Video Multiplex containing one or more MPEG2 Video Services, and an MPEG2 elementary stream (or streams) within this multiplex is used as a transport.

In one embodiment, the DIU 130 uses conventional methods to insert data defining an interactive application into the VBI of the broadcast feed. The North American Broadcast Teletext Standard (EIA-506), defines the methods and protocols for sending data in one or more lines of the VBI. However, a wide variety of other transport mechanisms are available, including those that broadcast the interactive application 170 separately from the television program. Such transport mechanisms include out-of-band transmitters, which transmit the interactive application 170 on an unused portion of the television frequency spectrum, and conventional frequency modulation ("FM") radio transmitters, which transmit the interactive application 170 outside the television frequency spectrum. In another embodiment, the DIU 130 uses conventional methods to insert data into an elementary stream within an MPEG2 multiplex. The DIU 130 may operate as an interface to a wide area network that connects the broadcaster 110 or broadcast sources 102 directly to various transmitters 190. In one embodiment, error checking or error correcting codes such as Hamming codes are inserted with the broadcast data. In one embodiment, the DIU 130 translates the data into a Hamming code, and in another embodiment, the data received by the DIU 130 from the broadcast server X140 is already encoded.

The DIU 130 is coupled to a transmitter 190 for transmitting the broadcast data 180, including the inserted interactive application. In one embodiment, the transmitter 190 is a satellite uplink transmitting the data 180 to local satellite receivers which then distribute the data 180 to the BR's 140 via cable. In another embodiment, the transmitter 190 is a conventional cable system head-end amplifier. In yet other embodiments, the transmitter 190 is a conventional television broadcast transmitter or a high-definition digital television transmitter.

In another embodiment, the DIU 130 inserts the interactive application 170 into the program before the program is broadcast. For example, the DIU 130 may insert an interactive application into the source copy of a television commercial. Accordingly, the interactive application is broadcast whenever the commercial is broadcast. In this embodiment, the broadcast server 120 does not need to synchronize the retrieval of the interactive application with the schedule listed in the playlist.

Broadcast Receiver

Regardless of transmission method and insertion time, the broadcast data 180 is received by a subscriber's BR 140. Although only a single BR 140 is illustrated in FIG. 1, it is understood that in a typical embodiment there are hundreds or thousands of BR's 140 receiving the broadcast data 180 and responding as described herein. In a typical embodiment, the BR 140 is a television set-top box receiving the data via a coaxial cable. Alternatively, the BR 140 may be integrated into the television. Moreover, other broadcast receivers, including a NTSC broadcast receiver, a high-definition television digital receiver, a video cassette recorder, or an FM radio receiver can also be used.

Figure 2:
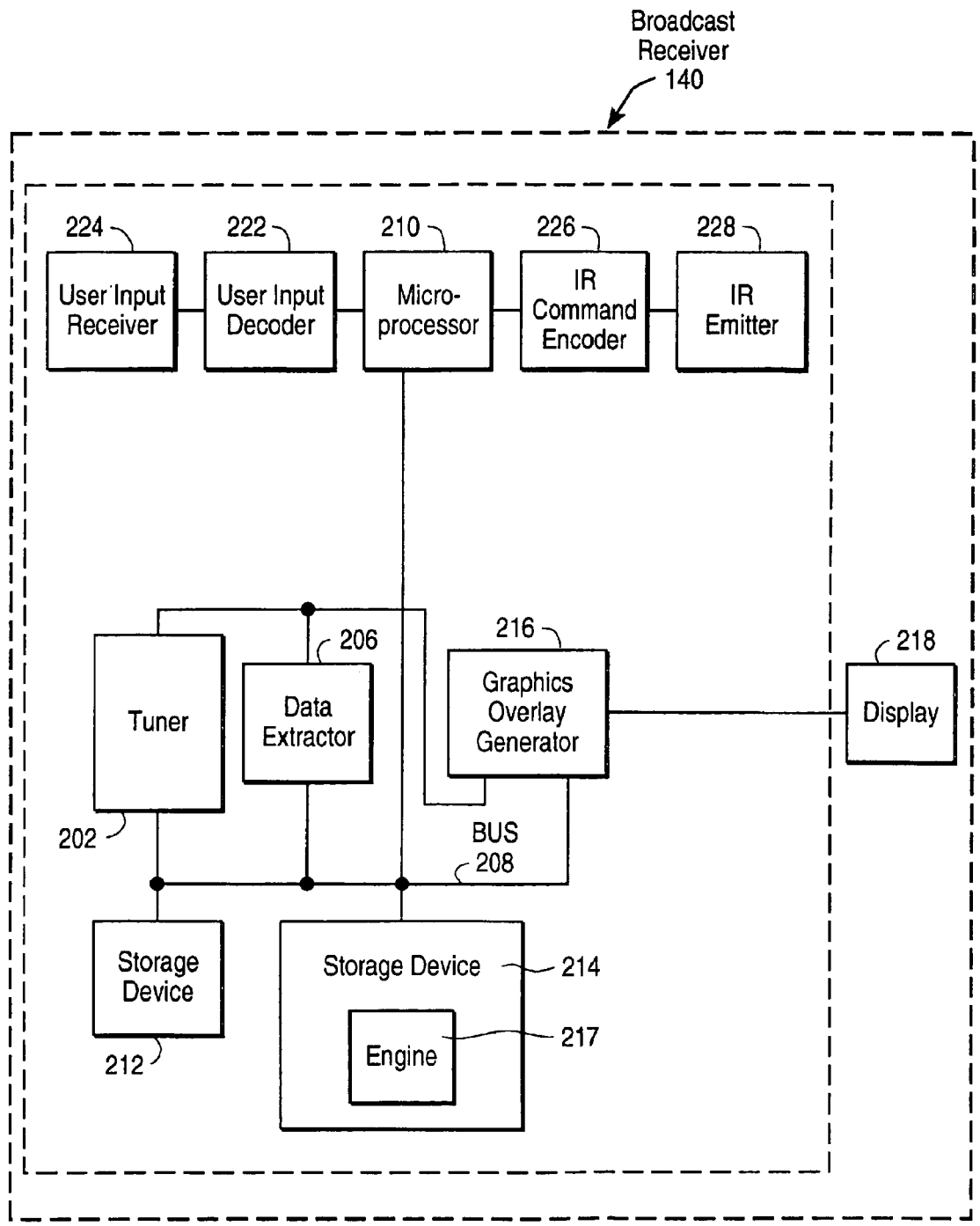
FIG. 2 is a block diagram illustrating an embodiment of a broadcast receiver according to an embodiment of the present invention.

FIG. 2 illustrates an embodiment of the BR 140 according to an embodiment of the present invention. In one embodiment, the BR 140 is the General Instrument CFT-2200 CATV set-top decoder. The BR 140 includes a tuner 202 for receiving the broadcast data 180 from the transmitter 190. In one embodiment, the tuner 202 is a conventional cable television tuner. In other embodiments, the tuner is a television broadcast tuner, a FM radio tuner, a digital tuner, or some other form of tuner. In one embodiment, a personal computer with the appropriate hardware and software may function to receive and display broadcast programs over various types of transmission channels, including cable, the Internet, and satellite. The embodiment illustrated in FIG. 2 shows a display 218, typically a television, within the BR 140. As mentioned above, the display 218 may also be located external to the BR 140.

The BR 140 also includes a data extractor 206 coupled to the tuner 202 for extracting the interactive application from the broadcast data 180. In one embodiment, the data extractor 206 is a conventional VBI inband data extraction circuit. In another embodiment, the data extractor 206 is a conventional modem. The data extractor 206 provides a serial bitstream containing the extracted interactive application onto a bus 208. The bus 208 is coupled to a microprocessor 210 which stores, via the bus 208, the extracted interactive application into a first storage device 212 as instructed by a program stored in a second storage device 214. In one embodiment, the microprocessor 210 uses the error code information from the extracted data to check or correct errors in the decoded interactive application. In one embodiment, the first storage device 212 is a conventional random access memory ("RAM") while the second storage device 214 is a conventional read-only memory ("ROM"). Other memory types, such as a flash memory which is readable and writeable yet retains its contents after a power loss, may be substituted for the second storage device 214. An advantage of flash memory is that software or data resident in the BR 140 can be modified by a received interactive application.

In one embodiment, the BR 140 also uses the data extractor 206 to extract a time signal from the broadcast data 180. The time signal indicates the current time using a standard timebase, such as Coordinated Universal Time ("UTC") or the subscriber's local time. In another embodiment, the BR 140 has a real-time clock that is either set by the subscriber or the received time signal. Regardless, the BR 140 preferably has access to the current time and, accordingly, can perform date stamping and timing functions.

As described below, the microprocessor 210 uses the program stored in the second storage device 214 and the interactive application stored in the first storage device 212 to execute the interactive application. The program stored in the second storage device 214 is preferably an execution engine 217 for executing an interactive application defined by various scripts, forms, definitions, and code and graphic resources. A preferred execution engine is the Wink Engine provided by Wink Communications, Inc. of Alameda, Calif.

The output from executing an interactive application may be, for example, a form presenting information or a menu to a television viewer or for receiving viewer input, or it may be a response, silent or otherwise, containing BR 140 or television usage data or indicating viewer preferences. To this end, the BR 140 preferably includes a graphics overlay generator 216 coupled to the bus 208 and driven by the interactive application 170 stored in the first storage device 212 and the program stored in the second storage device 214. The graphics overlay generator 216 generates a graphical display responsive to the interactive application 170. This graphical display is displayed on a display 218, typically a television, coupled to the BR 140. Of course, the graphics overlay generator 216 is typically not used when an interactive application silently executes.

In one embodiment, the graphics overlay generator 216 also receives the broadcast signal corresponding to a broadcast program from the tuner 202 to allow simultaneous display of the broadcast program and the graphical aspects, if any, of the interactive application 170, for example, to input data into a displayed form. In one embodiment, the microprocessor 210 is also coupled to a user input decoder 222 coupled to a user input receiver 224 to allow the user to communicate with the microprocessor 210 in order to respond to the interactive application 170. In one embodiment, the user input decoder 222 is a conventional infrared remote control decoder. The user input receiver 224 is preferably a conventional infrared receiver 224 with which the user may use a conventional hand held remote control device. Remote control keys pressed by the user translate to coded infrared signals that are received by the user input receiver 224, are decoded by the user input decoder 222, and sent to the microprocessor 210 to allow the user to communicate with the interactive application 170. The microprocessor 210 may also be coupled to a conventional infrared command encoder 226, which accepts an infrared command input and encodes a signal for a conventional infrared emitter 228 to allow the interactive application 170 to control external devices.

Broadcast Receiver Decoding of an Application

Figure 3:
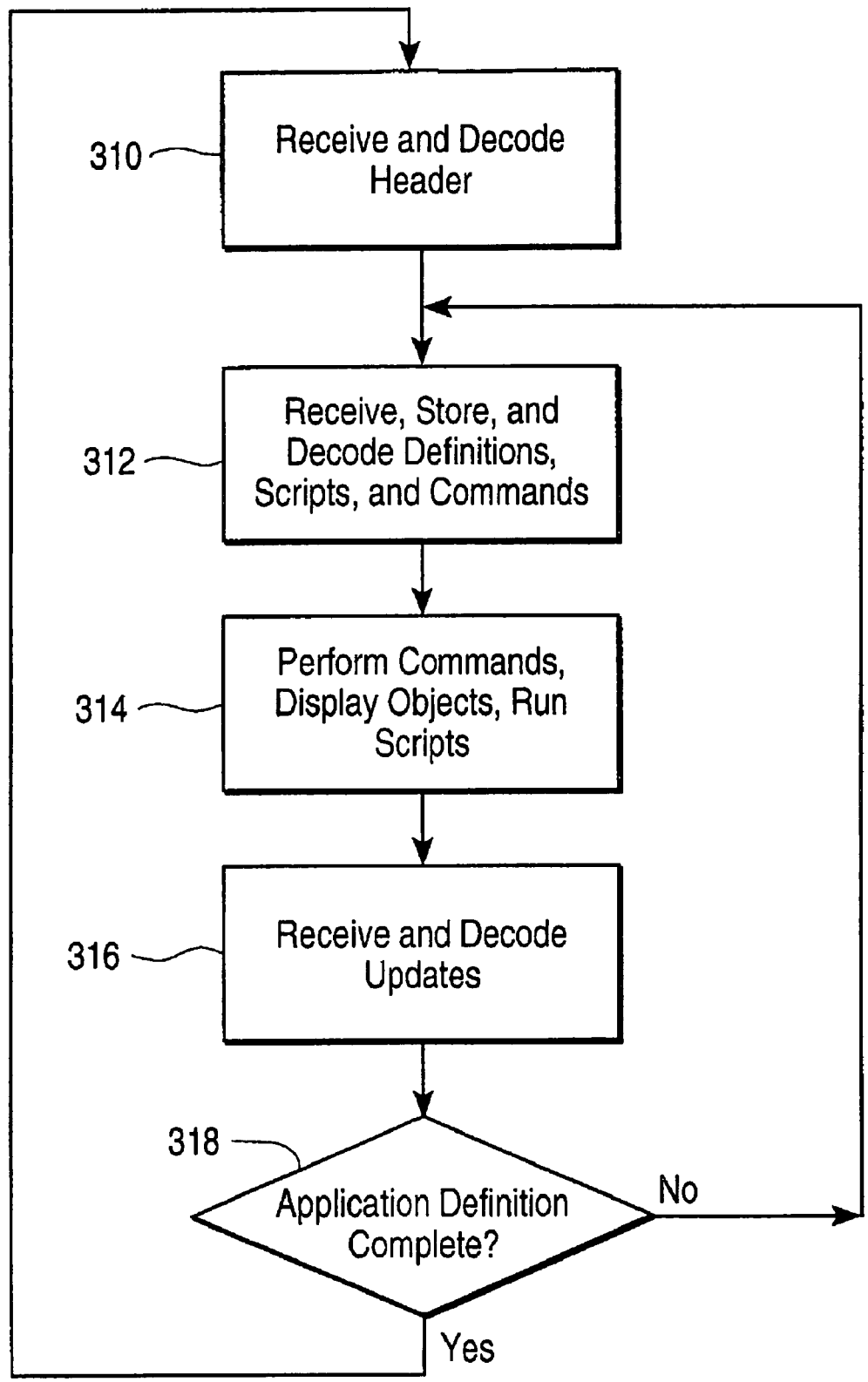
FIG. 3 is a flow chart illustrating steps for receiving and operating an interactive application according to an embodiment of the present invention.

FIG. 3 is a flow chart illustrating steps for receiving and operating an interactive application 170 using the compact information protocol according to a preferred embodiment of the present invention. The BR 140 receives and decodes 310 an application header record prepared by the broadcast server 120, inserted by the DIU 130, and transmitted by the transmitter 190. The application header record describes the information that follows and contains the application identification code, broadcaster identification code, server identification code, ATPR, and other application information as desired.

The BR 140 receives and decodes the definitions, commands, and scripts that comprise the interactive application 170, including the ATPR. The BR 140 executes 314 the interactive application 170. Some or all of the received interactive application 170 may be stored 312 within the BR 140. The ATPR is preferably so stored, as is a field indicating if the application is suspendable. If there are additional or updated definitions, commands, or scripts they may be sent until the application is complete 318. Updates to the interactive application 170 are received and decoded 316 by the BR 140. In a preferred embodiment of the present invention, the block containing the interactive application is repeatedly and continuously transmitted and received during the time period in which the interactive application is to execute.

Application Retirement Control

Application Retirement Control (ARC) is a feature of the system 100 which manages the retirement of an interactive application 170. It may be necessary to retire an interactive application 170 if the program material with which the interactive application 170 is associated has been terminated or temporarily suspended. It may also be necessary to retire an interactive application 170 if the connection between the broadcaster 110 and the BR 140 has unexpectedly been terminated, broken, lost, disabled, or has otherwise unexpectedly become unavailable.

ARC includes both active and passive control elements. Active control elements enable the broadcaster 110 to transmit notification to the BR 140 that the program material with which the interactive application 170 is associated has ended or has been temporarily suspended. Passive control elements control the retirement of an interactive application 170 when the BR 140 detects conditions that indicate that the interactive application is longer appropriate for the broadcast program material.

Active Control Elements

Active control elements enable the broadcaster 110 to transmit notification to the BR 140 that the program material with which the interactive application 170 is associated has ended or has been temporarily suspended. This is implemented through the transmission of packets of data containing instructions to the BR as to how to retire the interactive application. Active control elements include instructions to terminate the interactive application, and instructions to suspend the interactive application. When the instructions are to terminate the interactive application, the data packet containing these instructions is called a Terminate Command Block. When the instructions are to temporarily suspend the interactive application, the data packet containing these instructions is called a Suspend Command Block. The broadcaster 110 transmits a Terminate Command Block when the program material with which the interactive application 170 is associated is about to end, or has ended. The broadcaster 110 transmits a Suspend Command Block when the program material with which the interactive application 170 is associated is about to be suspended, or has been suspended.

In a preferred embodiment, a Terminate Command Block contains a field comprising the instructions for the termination of the interactive application. This field, called the terminate command type instructions field, contains multiple possible values. These values indicate the procedure by which the BR 140 is to terminate the interactive application 170. Table 1 illustrates the interpretations of the various possible values of the terminate command type instructions field in a preferred embodiment of the present invention.

TABLE 1

| Interpretation of terminate_command_type instructions field | |
|---|---|
| value of terminate_command_type field | Result |
| 1 | Terminate Regardless of Program State |
| 2 | Terminate if Program State is "Not in Protected Section" |

In an alternative embodiment, an additional numerical value indicates that the BR 140 is to wait the length of time indicated by the timeout field, described below, before terminating the interactive application 170. A greater or lesser number of termination types is also possible, if desired.

In an alternative embodiment, the Terminate Command Block contains an additional field indicating the length of time for the BR 140 to wait before terminating the interactive application 170, where appropriate. This field, called the timeout field, preferably defines 16 possible timeout periods the BR 140 is to wait before terminating the interactive application 170. Various embodiments contain fewer or more possible values indicating varying instructions as to the length of time to wait before terminating the interactive application, as desired.

In another embodiment, the BR 140 calculates the length of time to wait before terminating the interactive application 170 by multiplying the timeout field by a constant, for example twenty seconds.

In a preferred embodiment, a Suspend Command Block contains a field comprising the instructions for the suspension of the interactive application. This field, called the suspend command type instructions field, contains multiple possible values. These values indicate the procedure by which the BR 140 is to suspend the interactive application 170. Table 2 illustrates the interpretations of the various possible values in the suspend command type instructions field in a preferred embodiment of the present invention.

TABLE 2

Interpretation of suspend_command_type instructions field

| value of suspend_command_type field | Result |
| --- | --- |
| 1 | Suspend Regardless of Program State |
| 2 | Suspend if Program State is "Not in Protected Section" |

In an alternative embodiment, the Suspend Command Block contains an additional field indicating the length of time for which the BR 140 is to suspend the interactive application 170. This field is called a suspend timeout field, and operates as the timeout field described above.

Figure 4:
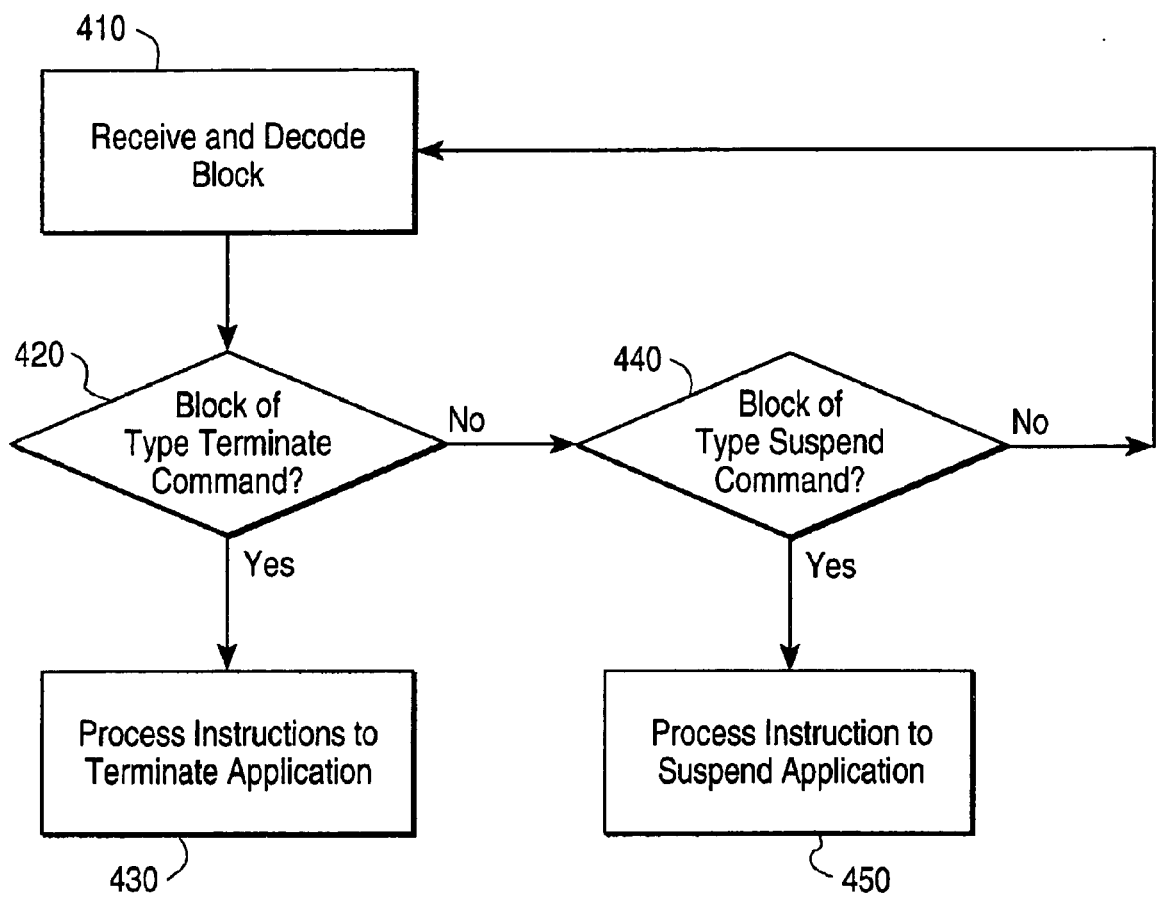
FIG. 4 is a flow chart illustrating high level steps for decoding and processing received packets of data indicating that the current interactive application is to be retired according to an embodiment of the present invention.

FIG. 4 is a flowchart illustrating the steps involved in the decoding and processesing of these blocks by the BR 140. The BR 140 receives and decodes 410 the block. If the block is of type Terminate Command (420) the BR 140 processes 430 the instructions to terminate the application. If the block is of type Suspend Command (440) the BR 140 processes 450 the instructions to suspend the application.

The Processing of a Terminate Command Block

Figure 5:
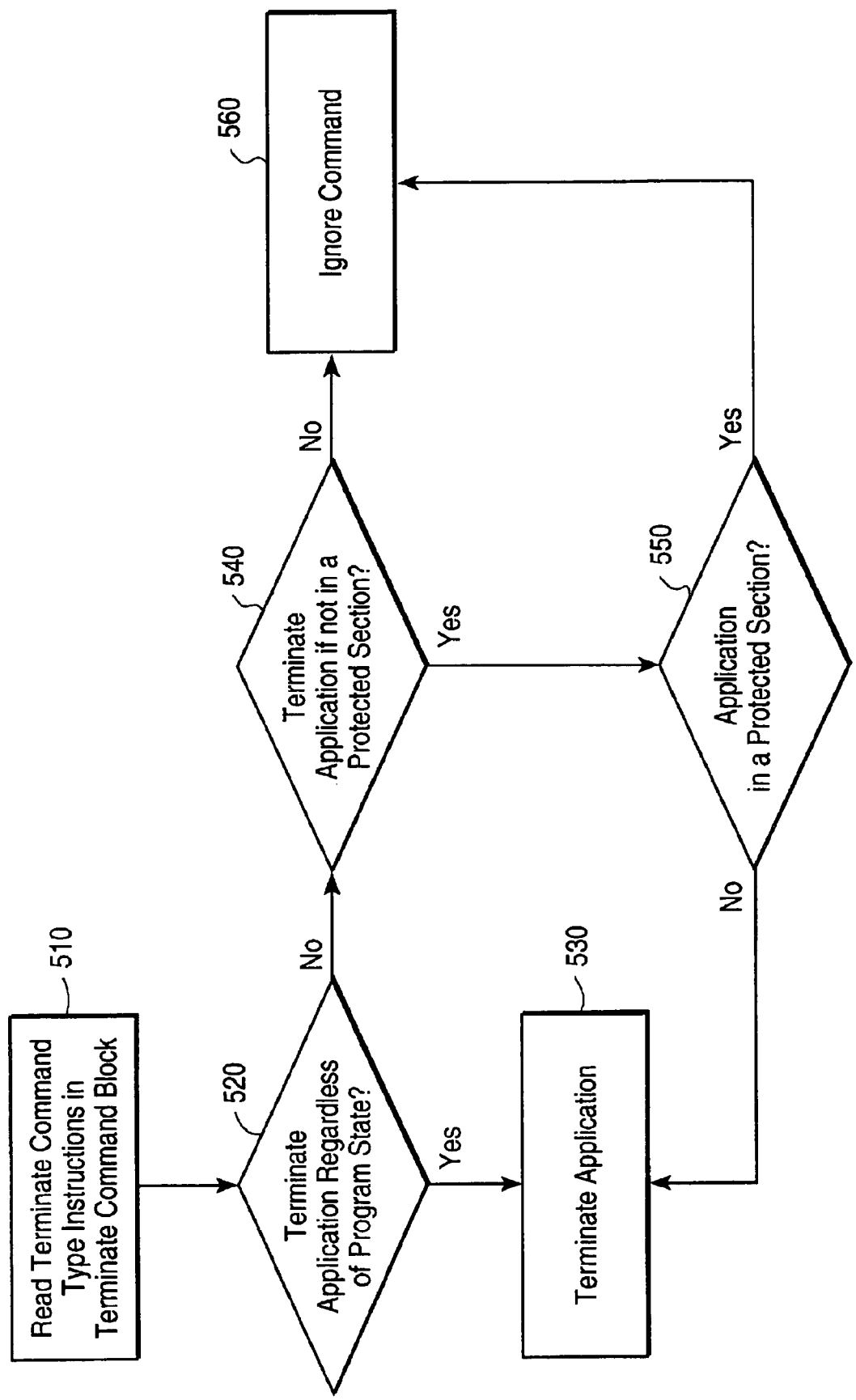
FIG. 5 is a flow chart illustrating steps for processing a received packet of data indicating that the current interactive application is to be terminated according to an embodiment of the present invention.

FIG. 5 is a flowchart illustrating the steps involved in the processing of a Terminate Command Block in a preferred embodiment of the present invention. The BR 140 reads 510 the terminate command type instructions in the Terminate Command Block. If the terminate command type instructions indicate 520 to terminate the interactive application 170 regardless of program state, the BR 140 terminates 530 the application.

In a preferred embodiment, if the terminate command type instructions indicate 540 to terminate the interactive application 170 if the application is not in a protected section, the BR 140 determines 550 if the interactive application 170 is in a protected section. A protected section of an application is a section defined by the application designer to be one in which the application should continue executing, even if the application is no longer appropriate for the broadcast material. The display of an interactive form may define a section of an application as a protected one. This will allow for the application to continue executing even during a commercial break in the middle of the program if the viewer is in the process of filling out the interactive form. Alternatively, a viewer's selection of an item on an interactive form may define a section of an application as protected.

In a preferred embodiment of the present invention, the code defining an interactive application determines which sections of the application are protected. The BR determines if an application is in a protected section by examining the interactive application code being executed. In one alternative embodiment, the interactive application 170 indicates the portions of the application that are protected through the use of flags or other markers. In another alternative embodiment, the interactive application 170 implements a de facto protected section by instructing the BR 140 to temporarily cease monitoring the broadcast signal.

If the interactive application 170 is not in a protected section, the BR 140 terminates 530 the interactive application. If the interactive application 170 is in a protected section, the BR 140 does not terminate the interactive application 170, but instead ignores 560 the terminate command. In an alternative embodiment, if the interactive application 170 is in a protected section, the BR 140 waits until the interactive application is no longer in a protected section, and then terminates the interactive application 170.

In an alternative embodiment, if the terminate command type instructions indicate to terminate the interactive application 170 after a set amount of time, the BR 140 determines the amount of time to wait before terminating the application. The BR makes this determination by reading the timeout field in the Terminate Command Block. The BR 140 waits for the length of time indicated by the timeout field, and then terminates 530 the application.

In an alternative embodiment, if the terminate command type instructions indicate to terminate the interactive application 170 after a set amount of time if the application is not in a protected section, the BR 140 determines if the interactive application 170 is in a protected section. If the interactive application 170 is not in a protected section, the BR 140 determines the amount of time to wait before terminating the application. The BR makes this determination by reading the timeout field in the Terminate Command Block. The BR 140 waits for the length of time indicated by the timeout field, and then terminates 530 the application. If the interactive application 170 is in a protected section, the BR 140 does not terminate it, but instead ignores 560 the terminate command. In an alternative embodiment, if the interactive application 170 is in a protected section, the BR 140 waits until the interactive application is no longer in a protected section, and then terminates the interactive application 170.

The Processing of a Suspend Command Block

Figure 6:
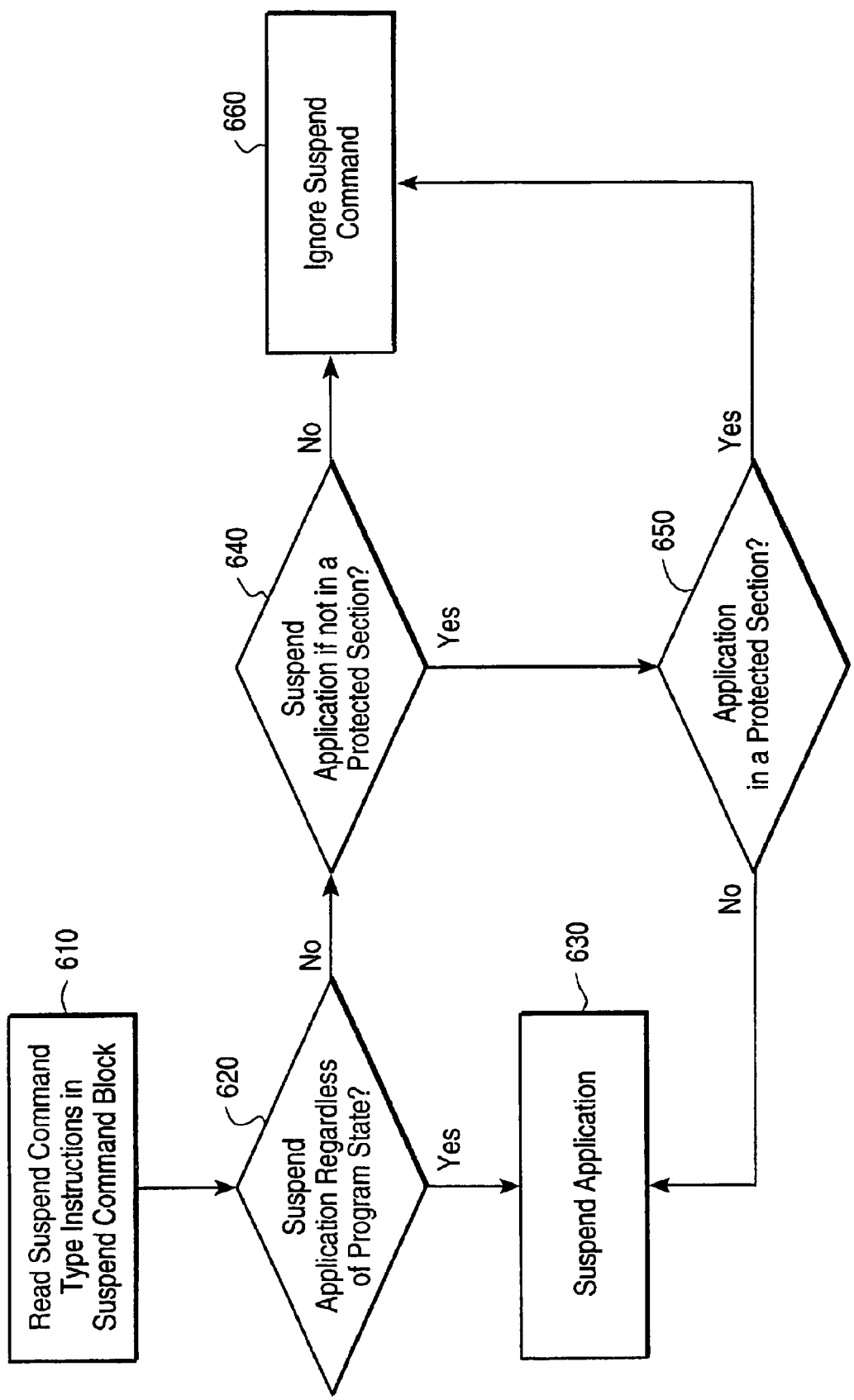
FIG. 6 is a flow chart illustrating steps for processing a received packet of data indicating that the current interactive application is to be suspended according to an embodiment of the present invention.

FIG. 6 is a flowchart illustrating the steps involved in the processing of a Suspend Command Block in a preferred embodiment of the present invention. The BR 140 reads 610 the suspend command type instructions in the Suspend Command Block. If the suspend command type instructions indicate 620 to suspend the interactive application 170 regardless of program state, the BR 140 suspends 630 the interactive application.

In a preferred embodiment, if the suspend command type instructions indicate 640 to suspend the interactive application 170 if the application is not in a protected section, the BR 140 determines 650 if the interactive application 170 is in a protected section. If the interactive application 170 is not in a protected section, the BR 140 suspends 630 the interactive application 170. If the interactive application 170 is in a protected section, the BR does not suspend the interactive application, but instead ignores 660 the suspend command. In an alternative embodiment, if the interactive application 170 is in a protected section, the BR 140 waits until the interactive application is no longer in a protected section, and then suspends the interactive application 170.

In a preferred embodiment of the present invention, once an interactive application has been suspended, it will remain suspended until the BR 140 receives a block containing the application identification code of the suspended interactive application. Typically, this will occur when the transmission of a television program resumes after a commercial break. In other words, receipt of a block with the same application identification code as the suspended application indicates that the suspended application is again appropriate for the broadcast material.

In an alternative embodiment, the BR 140 determines the length of time for which to suspend the application, by reading the suspend timeout field in the Suspend Command Block. In that embodiment, the BR 140 proceeds to suspend the interactive application 170 for the length of time so indicated.

Passive Control Elements

Figure 7:
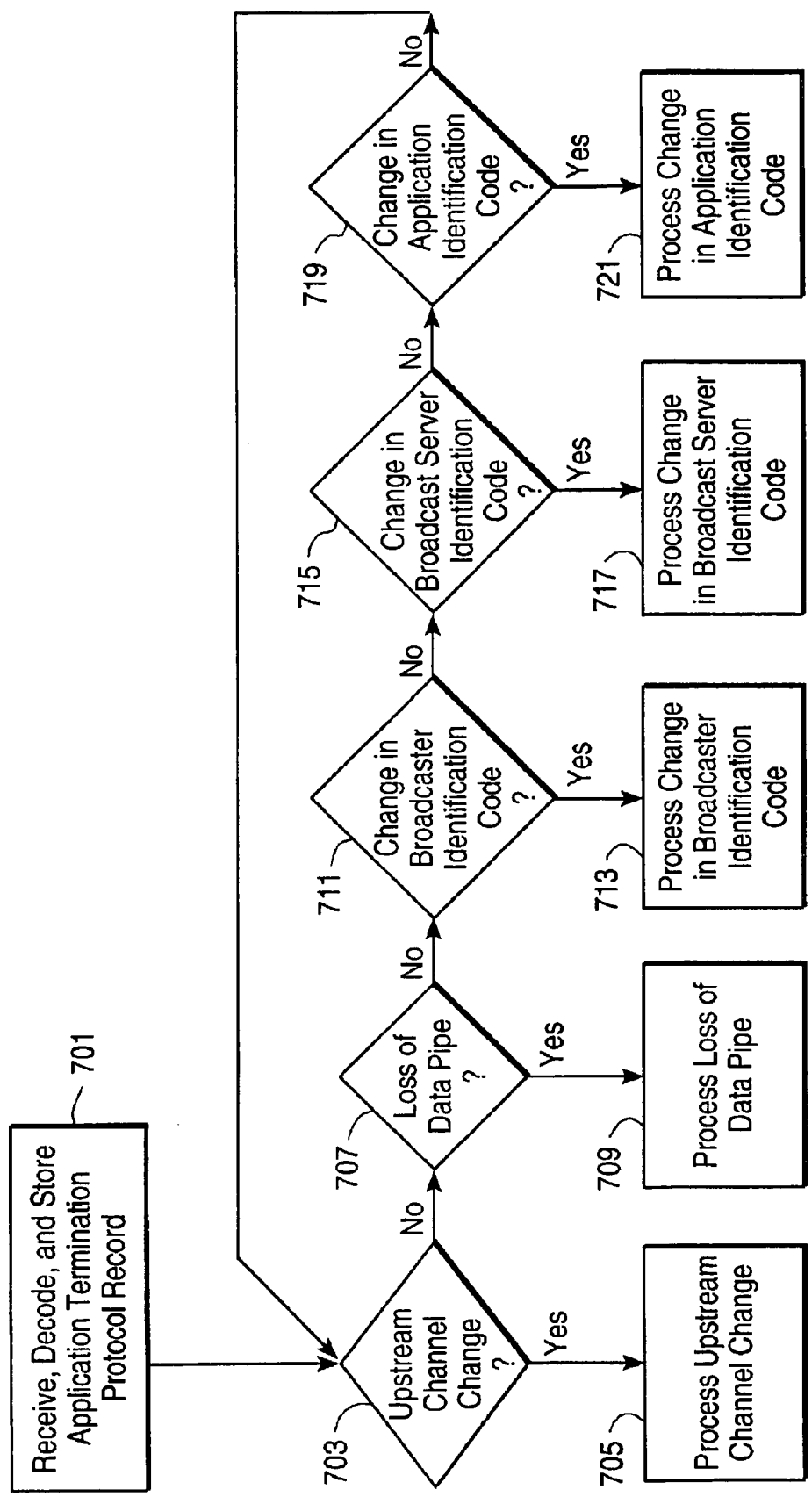
FIG. 7 is a flow chart illustrating high level steps for detecting and processing a condition indicating that the current interactive application is no longer appropriate for the broadcast program according to an embodiment of the present invention.

Passive control elements facilitate the retirement of an interactive application 170 when the BR 140 detects, without instructions from the broadcaster, conditions that indicate that the interactive application is no longer appropriate for the broadcast program material. FIG. 7 is a flowchart illustrating the high level steps involved in the detection of such a condition, and the subsequent processing by the BR 140.

As noted above, each interactive application preferably is associated with an Application Termination Protocol Record (ATPR) or similar data, containing instructions for retiring the application in a manner associated with an external event and a program state of the interactive application 170. When the BR 140 receives and decodes the definitions, commands, and scripts included in the interactive application 170, the BR 140 receives and decodes 701 the ATPR. The BR 140 stores the ATPR, along with various other elements of the interactive application 170. As the interactive application 170 executes, the BR 140 tests to detect certain conditions indicating that the interactive application 170 is no longer appropriate for the broadcast program. In one embodiment, when such a condition is detected, the BR 140 determines the appropriate retirement instructions for the detected condition and the internal program state of the interactive application 170 based on the ATPR. This allows the system designer to specify different retirement conditions appropriate to each type of passive change and interactive application program state. The ATPR further allows a given application to have variable individual retirement behaviors, including termination or suspension, for different combinations of external events and internal program states.

There exists a priority for the processing of such conditions if detected. Once a higher level priority condition has been detected, the BR 140 will not test for lower priority conditions, but will instead process the detected condition. For as long as the interactive application 170 executes, the BR 140 continues to check for conditions necessitating application retirement. Certain conditions for which the BR 140 tests, and their respective priorities are detailed below. It should be understood that the present invention is not limited to testing for and processing only the events, conditions, and program states detailed below. It is also possible for the present invention to test for and process various other events and conditions rendering the executing interactive application inappropriate for the broadcast program, and to detect various other program states determining the appropriate retirement behavior for the interactive application, as desired.

Test for an Upstream Channel Change

The BR 140 preferably tests 703 to determine if there has been an upstream channel change. A BR will preferably be capable of detecting 703 if a device such as a cable set-top box or a video cassette recorder has performed a channel change operation upstream from the BR 140. For example, a BR 140 may monitor a number of conditions such as horizontal and vertical synchronization and various VBI signals to determine when such conditions change. A sudden change in the vertical synchronization timing indicates an upstream channel change by a receiving device. Once a viewer has so changed the channel, the interactive application 170 will no longer be appropriate for the new broadcast program on the new channel. The BR will process 705 the detection of the upstream channel change, based upon the ATPR, as detailed below. Because an upstream channel change is of high priority, if the BR 140 detects 703 such a condition, the BR 140 does not test for further conditions, but instead immediately processes 705 the detection of the upstream channel change.

Test for a Loss of Data Pipe

If the BR 140 does not detect 703 an upstream channel change, the BR 140 preferably tests 707 to detect a loss of data pipe. A data pipe is a specific portion of the available data transport bandwidth, used for the one-time or continuous delivery of one or more interactive applications, during a specific or indefinite time period. A loss of data pipe is a condition in which the BR 140 is no longer receiving any interactive application blocks from the current data pipe, while that interactive application is executing. A number of different conditions may cause detection of the loss of data pipe. For example, the BR 140 will detect 707 a loss of data pipe if the broadcast program ends, and a new broadcast program begins for which the broadcaster is no longer inserting interactive application data into the broadcast signal. Because the program with which the interactive application is associated is no longer being broadcast, the interactive application likely needs to be retired. As another example, the BR 140 will detect 707 a loss of data pipe if the connection between the broadcaster and the BR 140 has been lost or interrupted. Again, under such circumstances the interactive application likely needs to be retired because no associated broadcast program is being received.

In one embodiment of the present invention, the BR 140 tests for loss of data pipe by monitoring the length of time between blocks on the application's current data pipe. Every time the BR 140 receives such a block, the BR 140 resets a timer. If this timer reaches a predetermined value before it is reset by the receipt of a new block, the BR 140 detects 707 that a loss of data pipe has occurred. The BR 140 then processes 709 the loss of data pipe, as detailed below.

Test for Change in Broadcaster Identification Code

If the BR 140 does not detect 707 a loss of data pipe, the BR 140 preferably tests 711 for a change in broadcaster identification code. A detection of change in broadcaster identification code indicates that a broadcaster other than the one associated with the currently executing interactive application is inserting interactive application data into the broadcast signal. Under such circumstances, the executing interactive application likely needs to be retired, because if the broadcaster has changed, then the broadcast program has likewise changed, and thus is no longer associated with the application. The BR 140 will detect 711 a change in broadcaster identification code if, for example, the viewer performed an upstream channel change which the BR 140 failed to detect.

A BR 140 tests 711 for a change in broadcaster identification code by examining each received block containing the interactive application, to see if data included therein uniquely identifying the broadcaster is the same as or different from corresponding data from the currently executing application. In one embodiment, this data is in the form of a checksum which is calculated from the broadcaster identification code, and uniquely identifies the broadcaster. Alternatively, the broadcaster identification code itself is used. In all embodiments, if the broadcaster identifying data are different, the BR 140 detects 711 that a change in broadcaster has occurred, and processes 713 this condition, as detailed below.

Test for Change in Broadcast Server Identification Code

If the BR 140 does not detect a change in broadcaster identification code, the BR 140 preferably tests 715 for a change in broadcast server identification. A detection of change in broadcast server indicates that a broadcaster other than, but affiliated with, the broadcaster associated with the currently executing interactive application is inserting interactive application data into the broadcast signal. All broadcasters affiliated with certain national networks will have the same broadcaster identification code. As with a change in broadcaster, when the BR 140 detects 715 a change in broadcast server, the executing interactive application likely needs to be retired, because the broadcast program has changed, and thus is no longer associated with the application. The BR 140 will so detect if, for example, the broadcast program with which the executing interactive application is associated has ended and no channel change has occurred, but a new broadcast program is being transmitted by a network affiliated broadcaster.

To test 715 for a change in broadcast server, the BR 140 examines each received block containing the interactive application, to see if data included therein uniquely identifying the broadcast server is the same as or different from corresponding data of the currently executing application. In one embodiment, this data is in the form of a server identification field, which contains the server identification code uniquely identifying the broadcast server 120. If the compared server identification fields are different, the BR 140 detects 715 that a change in broadcast server has occurred, and processes 717 this condition, as detailed below.

Test for Change in Interactive Application Identification Code

Preferably, if the BR 140 has still not detected a change, the BR 140 tests 719 for a change in the interactive application being transmitted. The detection of a change in interactive application indicates that an interactive application other than the one executing is being transmitted with the current broadcast program, and thus the executing interactive application is probably no longer appropriate for the broadcast material. Therefore, when the BR 140 detects 719 a change in interactive application being transmitted, the executing interactive application probably needs to be retired. The BR 140 will so detect 719 if, for example, the broadcast program with which the executing interactive application is associated has ended, and a new broadcast program with which a new interactive application is associated has begun.

To test 719 for a change in interactive application, the BR 140 examines each received block for the interactive application, to see if data uniquely identifying the interactive application to which the block belongs is the same as or different from corresponding data of the currently executing interactive application. In one embodiment, this data is in the form of the interactive application identification field, which contains the application identification code uniquely identifying the interactive application 170. If the compared application identification fields are different, the BR 140 detects 719 that a change in interactive application has occurred, and processes 721 this condition, as detailed below.

The foregoing sequence of tests reflects only one possible set of priorities for detection of conditions for retirement. The above tests may be performed in a different order, and with other tests which similarly detect a condition indicating that the interactive application is no longer appropriate for the current broadcast program.

Processing of a Detected Condition

When the BR 140 has detected one of the above detailed conditions or any other event or condition determined by the system designer to indicate that the interactive application is no longer appropriate for the broadcast program, the BR 140 reads the retirement instructions associated with the detected external event and the internal program state of the interactive application from the interactive application's stored ATPR. The ATPR contains retirement instructions for the interactive application 170 associated with external events and internal program states of the interactive application.

Table 3 illustrates the format of a portion of an ATPR in a preferred embodiment of the present invention. It is also possible for the ATPR to include instructions for processing other conditions rendering the executing interactive application inappropriate for the broadcast program, as desired.

TABLE 3

Application Termination Protocol Record

Field Name upstream_channel_change
loss_of_data_pipe
change_in_broadcaster_id
change_in_server_id
change_in_application Each field is of sufficient size to encode one or more instructions for responding to the detected condition.

Processing the Detection of an Upstream Channel Change

Figure 8:
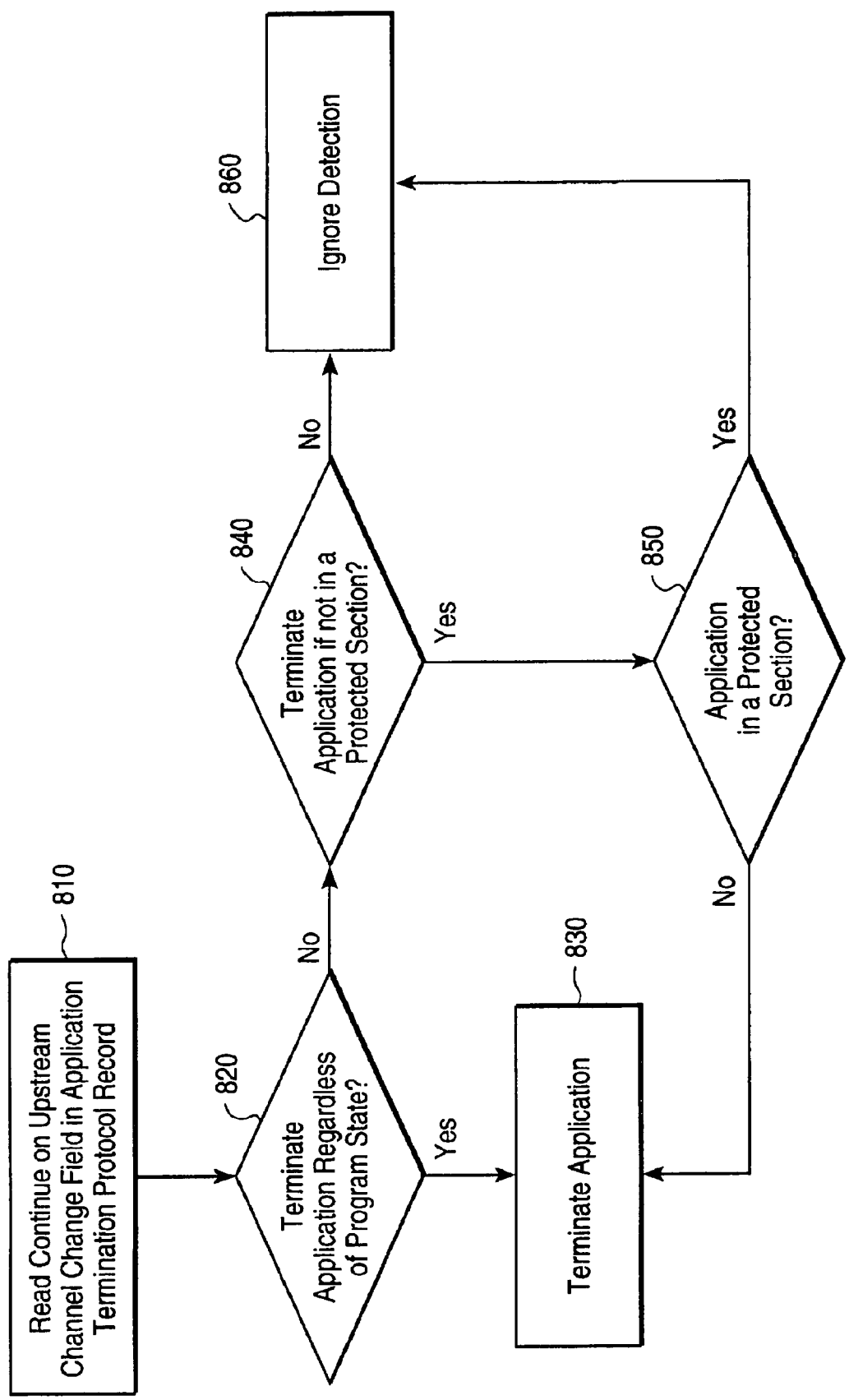
FIG. 8 is a flow chart illustrating steps for processing the detection of an upstream channel change according to an embodiment of the present invention.

FIG. 8 is a flowchart illustrating the steps involved in the processing of the detection of an upstream channel change. When the BR 140 detects 703 an upstream channel change, the BR 140 reads 810 the upstream_channel_change field in the ATPR to determine how to process this type of condition. In a preferred embodiment of the present invention, there are multiple possible values of the upstream_channel_change field to indicate the procedure by which the BR 140 is to retire the interactive application 170. Table 4 illustrates the interpretations of the various possible values of the upstream_channel_change field. A greater or lesser number of procedures by which the BR 140 is to retire the interactive application is also possible, if desired.

TABLE 4

Interpretation of upstream_channel_change field

| value of upstream_channel_change field | Result |
|---|---|
| 1 | Terminate Regardless of Program State |
| 2 | Reserved |
| 3 | Terminate if Program State is "Not in Protected Section" |
| 4 | Continue Regardless of Program State |

If the upstream_channel_change field indicates 820 to terminate the interactive application 170 regardless of program state, the BR 140 terminates 830 the application.

If the upstream_channel_change field indicates 840 to terminate the interactive application 170 if the application is not in a protected section, the BR 140 determines 850 if the interactive application 170 is in a protected section. If the interactive application 170 is not in a protected section, the BR 140 terminates 830 the interactive application. If the interactive application 170 is in a protected section, the BR 140 does not terminate the interactive application 170, but instead ignores 860 the detection. In an alternative embodiment, if the interactive application 170 is in a protected section, the BR 140 waits until the interactive application is no longer in a protected section, and then terminates the interactive application 170.

If the upstream_channel_change field indicates 811 not to terminate the interactive application 170, the BR 140 does not terminate the interactive application 170, but instead ignores 860 the detection.

If the upstream_channel_change is reserved, the BR 140 terminates the application. However, the system designer may use the reserved value to define other terminate behavior specific to the application.

Processing the Detection of a Loss of Data Pipe

Figure 9:
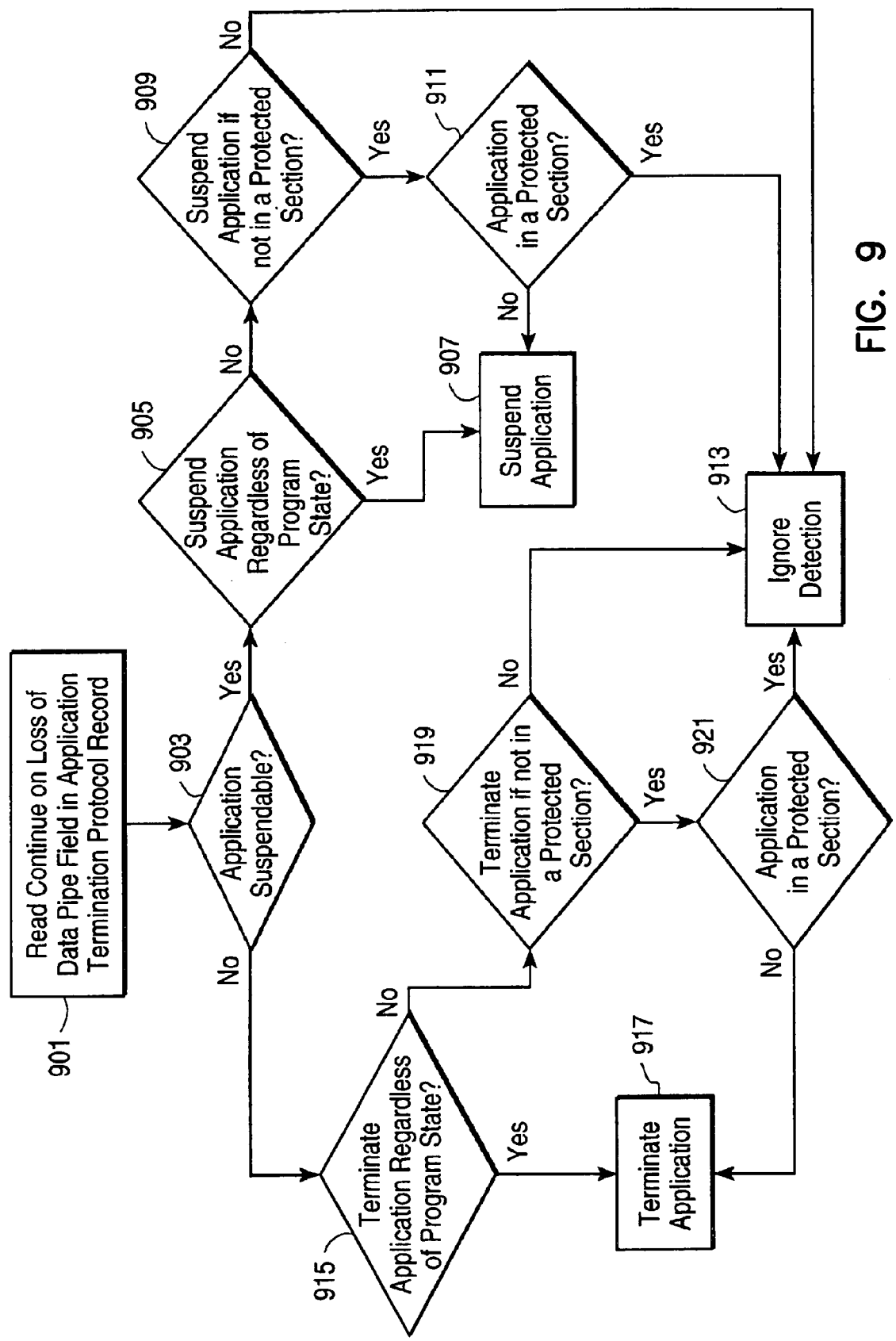
FIG. 9 is a flow chart illustrating steps for processing the detection of a loss of data pipe according to an embodiment of the present invention.

FIG. 9 is a flowchart illustrating the steps involved in the processing of the detection of a loss of data pipe. When the BR 140 detects 707 a loss of data pipe, the BR 140 reads 901 the loss_of_data_pipe field in the ATPR to determine how to process this detection. In a preferred embodiment of the present invention, there are multiple possible values of the loss_of_data_pipe field, to indicate the procedure by which the BR 140 is to retire the interactive application 170.

The BR 140 next reads 903 the appropriate stored field of the interactive application to determine if the interactive application is suspendable. The multiple possible values of the loss_of_data_pipe field are interpreted differently if the interactive application is suspendable than if the interactive application is not suspendable. Table 5 illustrates the interpretation of the various possible values of the loss_of_data_pipe field where the interactive application is suspendable in a preferred embodiment of the present invention. A greater or lesser number of procedures by which the BR 140 is to retire the interactive application is also possible, if desired.

TABLE 5

Interpretation of loss_of_data_pipe field
during execution of a suspendable application

| value of loss_of_data_pipe field | Result |
|---|---|
| 1 | Suspend Regardless of Program State |
| 2 | Reserved |
| 3 | Suspend if Program State is "Not in Protected Section" |
| 4 | Continue Regardless of Program State |

If the interactive application 170 is suspendable, and the loss_of_data_pipe field indicates 905 to suspend the interactive application 170 regardless of program state, the BR 140 suspends 907 the interactive application.

If the interactive application 170 is suspendable, and the loss_of_data_pipe field indicates 909 to suspend the interactive application 170 if the application is not in a protected section, the BR 140 determines 911 if the interactive application 170 is in a protected section. If the interactive application 170 is not in a protected section, the BR 140 suspends 907 the interactive application 170. If the interactive application 170 is in a protected section, the BR does not suspend the interactive application, but instead ignores 913 the detection In an alternative embodiment, if the interactive application 170 is in a protected section, the BR 140 waits until the interactive application is no longer in a protected section, and then suspends the interactive application 170.

Once an interactive application has been suspended, it will remain suspended until the BR 140 receives a block containing the application identification code of the suspended interactive application. Typically, this will occur when the transmission of a television program resumes after a commercial break.

If the loss_of_data_pipe field indicates not to suspend the interactive application 170, the BR 140 does not suspend the interactive application 170, but instead ignores 913 the detection.

Table 6 illustrates the interpretation of the various possible values of the loss_of_data_pipe field where the interactive application is not suspendable.

TABLE 6

Interpretation of loss_of_data_pipe field
during execution of a non-suspendable application

| value of loss_of_data_pipe field | Result |
|---|---|
| 1 | Terminate Regardless of Program State |
| 2 | Reserved |
| 3 | Terminate if Program State is "Not in Protected Section" |
| 4 | Continue Regardless of Program State |

If the interactive application 170 is not suspendable, and the loss_of_data_pipe field indicates 915 to terminate the interactive application 170 regardless of program state, the BR 140 terminates 917 the application.

If the interactive application 170 is not suspendable, and the loss_of_data_pipe field indicates 919 to terminate the interactive application 170 if the application is not in a protected section, the BR 140 determines 921 if the interactive application 170 is in a protected section. If the interactive application 170 is not in a protected section, the BR 140 terminates 917 the interactive application. If the interactive application 170 is in a protected section, the BR 140 does not terminate the interactive application 170, but instead ignores 913 the detection. In an alternative embodiment, if the interactive application 170 is in a protected section, the BR 140 waits until the interactive application is no longer in a protected section, and then terminates the interactive application 170.

If the loss_of_data_pipe field indicates not to terminate the interactive application 170, the BR 140 does not terminate the interactive application 170, but instead ignores 913 the detection.

Processing the Detection of a Change in Broadcaster Identification Code

Figure 10:
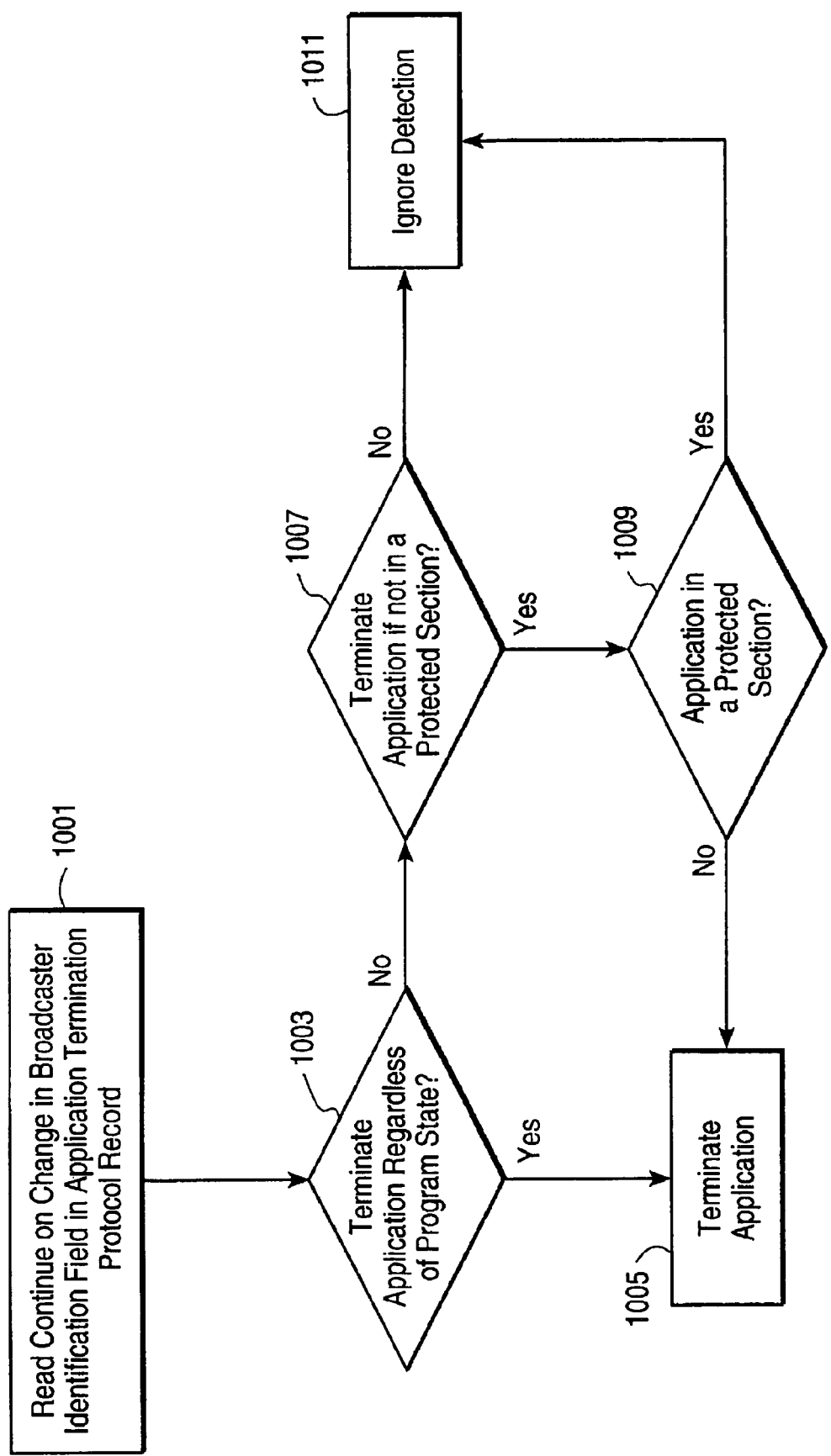
FIG. 10 is a flow chart illustrating steps for processing the detection of a change in broadcaster identification code according to an embodiment of the present invention.

FIG. 10 is a flowchart illustrating the steps involved in the processing of the detection of a change in broadcaster identification code. When the BR 140 detects 713 a change in broadcaster identification code, the BR 140 reads 1001 the change_in_broadcaster_id field in the ATPR to determine how to process this detection. In a preferred embodiment of the present invention, there are multiple possible values of the change_in_broadcaster_id field to indicate the procedure by which the BR 140 is to retire the interactive application 170. Table 7 illustrates the interpretations of the various possible values of the change_in_broadcaster_id field. A greater or lesser number of procedures by which the BR 140 is to retire the interactive application is also possible, if desired.

TABLE 7

Interpretation of change_in_broadcaster_id field

| value of change_in_broadcaster_id field | Result |
|---|---|
| 1 | Terminate Regardless of Program State |
| 2 | Reserved |
| 3 | Terminate if Program State is "Not in Protected Section" |
| 4 | Continue Regardless of Program State |

If the change_in_broadcaster_id field indicates 1003 to terminate the interactive application 170 regardless of program state, the BR 140 terminates 1005 the application.

If the change_in_broadcaster_id field indicates 1007 to terminate the interactive application 170 if the application is not in a protected section, the BR 140 determines 1009 if the interactive application 170 is in a protected section. If the interactive application 170 is not in a protected section, the BR 140 terminates 1005 the interactive application. If the interactive application 170 is in a protected section, the BR 140 does not terminate the interactive application 170, but instead ignores 1011 the detection. In an alternative embodiment, if the interactive application 170 is in a protected section, the BR 140 waits until the interactive application is no longer in a protected section, and then terminates the interactive application 170.

If the change_in_broadcaster_id field indicates not to terminate the interactive application 170, the BR 140 does not terminate the interactive application 170, but instead ignores 1011 the detection.

Processing the Detection of a Change in Broadcast Server Identification Code

Figure 11:
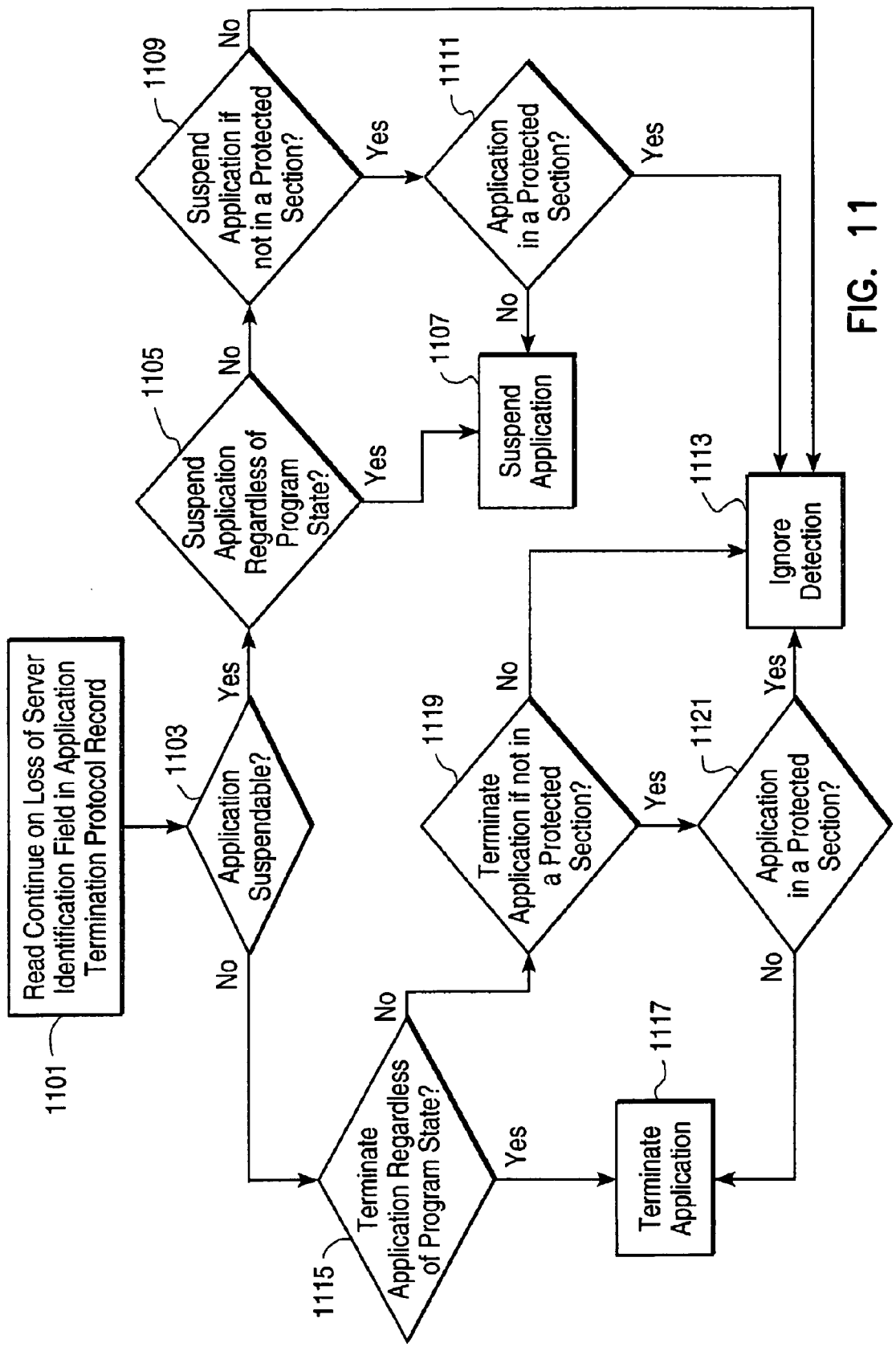
FIG. 11 is a flow chart illustrating steps for processing the detection of a change in broadcast server identification code according to an embodiment of the present invention.

FIG. 11 is a flowchart illustrating the steps involved in the processing of the detection of a change in broadcast server identification code. When the BR 140 detects 717 a change in the broadcast server identification code, the BR 140 reads 1101 the change_in_server_id field in the ATPR to determine how to process this detection. In a preferred embodiment of the present invention, there are multiple possible values of the change_in_server_id field to indicate the procedure by which the BR 140 is to retire the interactive application 170.

The BR 140 next reads 1103 the appropriate stored field of the interactive application to determine if the interactive application is suspendable. The multiple possible values of the change_in_server_id field are interpreted differently if the interactive application is suspendable than if the interactive application is not suspendable. Table 8 illustrates the interpretation of the various possible values of the change_in_server_id field where the interactive application is suspendable in a preferred embodiment of the present invention. A greater or lesser number of procedures by which the BR 140 is to retire the interactive application is also possible, if desired.

TABLE 8

Interpretation of change_in_server_id field during execution of a suspendable application

| value of continue_on_change_in_server_ID field | Result |
|---|---|
| 1 | Suspend Regardless of Program State |
| 2 | Reserved |
| 3 | Suspend if Program State is "Not in Protected Section" |
| 4 | Continue Regardless of Program State |

If the interactive application 170 is suspendable, and the change_in_server_id field indicates 1105 to suspend the interactive application 170 regardless of program state, the BR 140 suspends 1107 the interactive application.

If the interactive application 170 is suspendable, and the change_in_server_id field indicates 1109 to suspend the interactive application 170 if the application is not in a protected section, the BR 140 determines 1111 if the interactive application 170 is in a protected section. If the interactive application 170 is not in a protected section, the BR 140 suspends 1107 the interactive application 170. If the interactive application 170 is in a protected section, the BR does not suspend the interactive application, but instead ignores 1113 the detection. In an alternative embodiment, if the interactive application 170 is in a protected section, the BR 140 waits until the interactive application is no longer in a protected section, and then suspends the interactive application 170.

Once an interactive application has been suspended, it will remain suspended until the BR 140 receives a block containing the application identification code of the suspended interactive application. Typically, this will occur when the transmission of a television program resumes after a commercial break.

If the change_in_server_id field indicates not to suspend the interactive application 170, the BR 140 does not suspend the interactive application 170, but instead ignores 1113 the detection.

Table 9 illustrates the interpretation of the various possible values of the change_in_server_id field where the interactive application is not suspendable in a preferred embodiment of the present invention.

TABLE 9

Interpretation of change_in_server_id field during execution of a non-suspendable application

| value of change_in_server_id field | Result |
|---|---|
| 1 | Terminate Regardless of Program State |
| 2 | Reserved |
| 3 | Terminate if Program State is "Not in Protected Section" |
| 4 | Continue Regardless of Program State |

If the interactive application 170 is not suspendable, and the change_in_server_id field indicates 1115 to terminate the interactive application 170 regardless of program state, the BR 140 terminates 1117 the application.

If the interactive application 170 is not suspendable, and the change_in_server_id field indicates 1119 to terminate the interactive application 170 if the application is not in a protected section, the BR 140 determines 1121 if the interactive application 170 is in a protected section. If the interactive application 170 is not in a protected section, the BR 140 terminates 1117 the interactive application. If the interactive application 170 is in a protected section, the BR 140 does not terminate the interactive application 170, but instead ignores 1113 the detection. In an alternative embodiment, if the interactive application 170 is in a protected section, the BR 140 waits until the interactive application is no longer in a protected section, and then terminates the interactive application 170.

If the change_in_server_id field indicates not to terminate the interactive application 170, the BR 140 does not terminate the interactive application 170, but instead ignores 1113 the detection.

Figure 12:
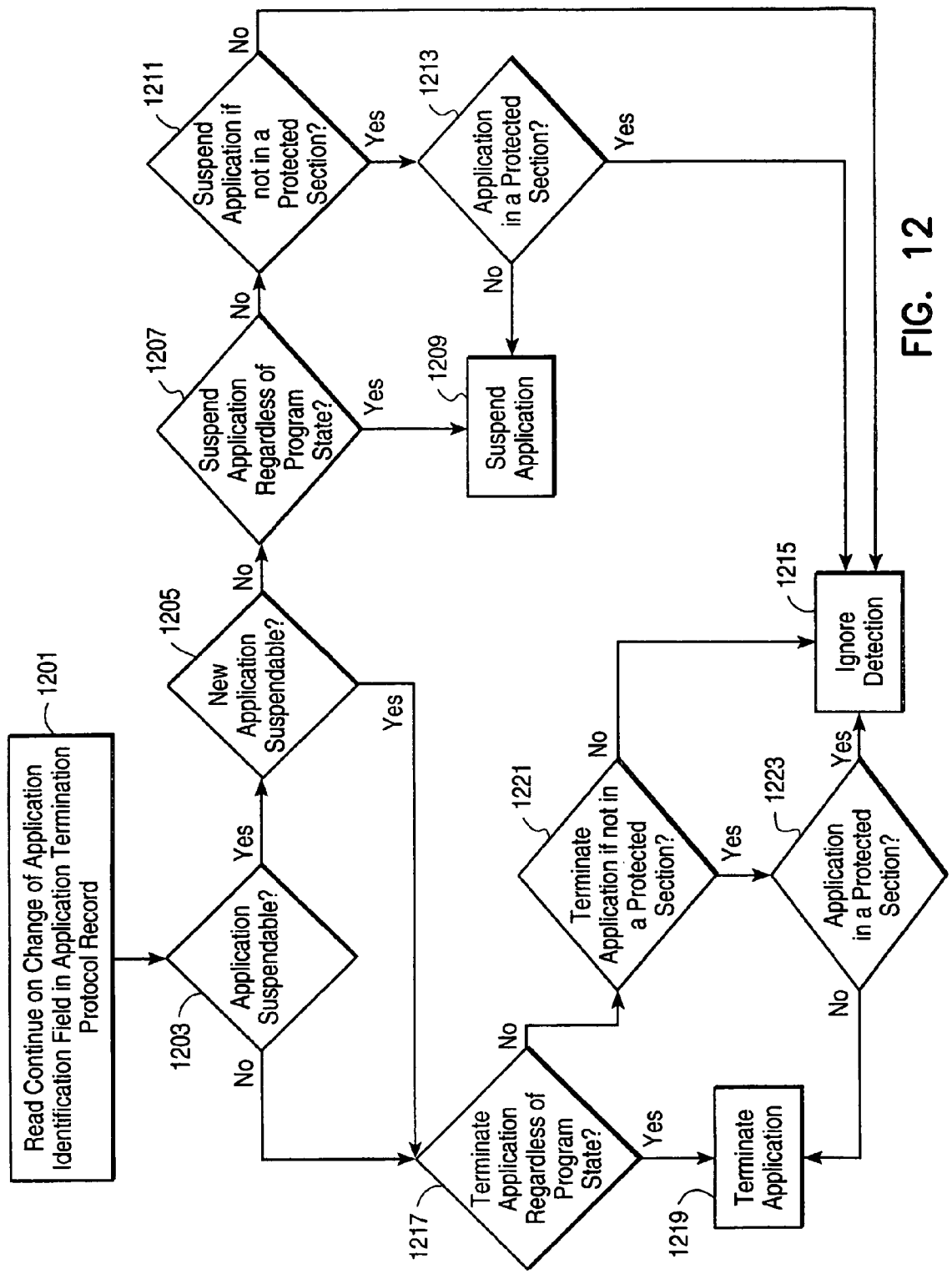
FIG. 12 is a flow chart illustrating steps for processing the detection of a change in interactive application identification code according to an embodiment of the present invention.

Processing the Detection of a Change in Interactive Application Identification Code FIG. 12 is a flowchart illustrating the steps involved in the processing of the detection of a change in interactive application identification code. When the BR 140 detects 721 a change in the interactive application code, the BR 140 reads 1201 the change_in_application field in the ATPR to determine how to process this detection. In a preferred embodiment of the present invention, there are multiple possible values of the change_in_application field to indicate the procedure by which the BR 140 is to retire the interactive application 170.

The BR 140 next reads 1203 the appropriate stored field of the executing interactive application to determine if the executing interactive application is suspendable. The multiple possible values of the change_in_application field are interpreted differently if the interactive application is suspendable than if the interactive application is not suspendable.

If the executing interactive application is suspendable, the BR 140 reads 1205 the appropriate field of the new interactive application to determine if it is suspendable. The multiple possible values of the the change_in_application field are interpreted differently if the new interactive applications is suspendable than if the new interactive application is not suspendable. Table 10 illustrates the interpretation of the various possible values of the change_in_application field where the executing interactive application is suspendable and the new interactive application is also suspendable in a preferred embodiment of the present invention. A greater or lesser number of procedures by which the BR 140 is to retire the interactive application is also possible, if desired.

TABLE 10

Interpretation of change_in_application field during execution of a suspendable application, when the new application is also suspendable

| value of change_in_application field | Result |
| --- | --- |
| 1 | Terminate Regardless of Program State |
| 2 | Reserved |
| 3 | Terminate if Program State is "Not in Protected Section" |
| 4 | Continue Regardless of Program State |

If the interactive application 170 is suspendable and the new interactive application is also suspendable 1205, and the change_in_application field indicates 1217 to terminate the interactive application 170 regardless of program state, the BR 140 terminates 1219 the application.

If the interactive application 170 is suspendable and the new interactive application is also suspendable 1205, and the change_in_application field indicates 1221 to terminate the interactive application 170 if the application is not in a protected section, the BR 140 determines 1223 if the interactive application 170 is in a protected section. If the interactive application 170 is not in a protected section, the BR 140 terminates 1219 the interactive application. If the interactive application 170 is in a protected section, the BR 140 does not terminate the interactive application 170, but instead ignores 1215 the detection. In an alternative embodiment, if the interactive application 170 is in a protected section, the BR 140 waits until the interactive application is no longer in a protected section, and then terminates the interactive application 170.

If the change_in_application field indicates not to terminate the interactive application 170, the BR 140 does not terminate the interactive application 170, but instead ignores 1215 the detection.

Table 11 illustrates the interpretation of the various possible values of the change_in_application field where the executing interactive application is suspendable, but the new application is not suspendable in a preferred embodiment of the present invention.

TABLE 11

Interpretation of change_in_application field during execution of a suspendable application, when the new application is non-suspendable

| value of change_in_application field | Result |
| --- | --- |
| 1 | Suspend Regardless of Program State |
| 2 | Reserved |
| 3 | Suspend if Program State is "Not in Protected Section" |
| 4 | Continue Regardless of Program State |

If the interactive application 170 is suspendable and the new interactive application is not suspendable, and the change_in_application field indicates 1207 to suspend the interactive application 170 regardless of program state, the BR 140 suspends 1209 the interactive application.

If the interactive application 170 is suspendable and the new interactive application is not suspendable, and the change_in_application field indicates 1211 to suspend the interactive application 170 if the application is not in a protected section, the BR 140 determines 1213 if the interactive application 170 is in a protected section. If the interactive application 170 is not in a protected section, the BR 140 suspends 1209 the interactive application 170. If the interactive application 170 is in a protected section, the BR does not suspend the interactive application, but instead ignores 1215 the detection. In an alternative embodiment, if the interactive application 170 is in a protected section, the BR 140 waits until the interactive application is no longer in a protected section, and then suspends the interactive application 170.

In a preferred embodiment of the present invention, once an interactive application has been suspended, it will remain suspended until the BR 140 receives a block containing the application identification code of the suspended interactive application. Typically, this will occur when the transmission of a television program resumes after a commercial break.

If the change_in_application field indicates not to suspend the interactive application 170, the BR 140 does not suspend the interactive application 170, but instead ignores 1215 the detection.

Table 12 illustrates the interpretation of the various possible values of the change_in_application field where the interactive application is not suspendable in a preferred embodiment of the present invention.

TABLE 12

Interpretation of change_in_application field during execution of a non-suspendable application

| value of change_in_application field | Result |
| --- | --- |
| 1 | Terminate Regardless of Program State |
| 2 | Reserved |
| 3 | Terminate if Program State is "Not in Protected Section" |
| 4 | Continue Regardless of Program State |

If the interactive application 170 is not suspendable, and the change_in_application field indicates 1217 to terminate the interactive application 170 regardless of program state, the BR 140 terminates 1219 the application.

If the interactive application 170 is not suspendable, and the change_in_application field indicates 1221 to terminate the interactive application 170 if the application is not in a protected section, the BR 140 determines 1223 if the interactive application 170 is in a protected section. If the interactive application 170 is not in a protected section, the BR 140 terminates 1219 the interactive application. If the interactive application 170 is in a protected section, the BR 140 does not terminate the interactive application 170, but instead ignores 1215 the detection. In an alternative embodiment, if the interactive application 170 is in a protected section, the BR 140 waits until the interactive application is no longer in a protected section, and then terminates the interactive application 170.

If the change_in_application field indicates not to terminate the interactive application 170, the BR 140 does not terminate the interactive application 170, but instead ignores 1215 the detection.

Alternative Embodiments of Passive Control Elements

In alternative embodiments, reserved values in the ATRP may indicate that the BR 140 is to wait varying lengths of time before terminating or suspending the interactive application 170. In one alternative, this length of time indicated by an additional field contained in the ATPR, called the timeout field. In another alternative, the BR 140 calculates the length of time to wait before by multiplying the timeout field by a constant, for example twenty seconds.

Retirement Upon the Expiration of the Allowable Time Period for Execution

In the preferred embodiment of the present invention, each interactive application 170 includes a definition of a time period within a broadcast of an associated television program during which the interactive application 170 may be executed by the Broadcast Receiver 140, instructions for retiring the interactive application 170 when this period of time has expired, and a reference time base to which this period of time is relative. The period of time comprises an earliest possible time at which execution of the interactive application may begin, relative to the reference time base, and a time by which the interactive application must be retired, also relative to the reference time base. The period of time, associated retirement instructions, and reference time base are preferably included in the first record of the interactive application 170. Upon receipt of this information, the Broadcast Receiver 140 initializes an internal time counter and begins keeping track of the passage of time relative to the reference time base. Additionally, the Broadcast Receiver 140 stores the instructions for retiring the interactive application 170 when the period of time during which the interactive application 170 may be executed has expired. The retirement instructions follow the formats described above.

The BR 140 will not begin execution of the interactive application until the period of time in which the interactive application 170 may be executed has begun. If the period of time during which the interactive application 170 may be executed expires but the interactive application 170 has not been retired, the Broadcast Receiver 140 retires the interactive application according to the stored retirement instructions. The reference time base may be retransmitted by the broadcaster 110, in which case the BR 140 will reinitialize its internal time counter.

In alternative embodiments of the present invention, these elements are absent.

We claim:

1. A method for retiring interactive applications associated with television broadcast programs by a broadcast receiver coupled to a display, the method comprising:

receiving by the broadcast receiver an interactive application which is associated with a television program, and which includes a plurality of retirement instructions for retiring the interactive application in response to combinations of external events and internal program states;

executing the interactive application by the broadcast receiver while concurrently displaying the television program;

detecting an external event by the broadcast receiver indicating that the execution of the interactive application is no longer appropriate for the television program being displayed;

detecting an internal program state of the interactive application, wherein the internal program state includes at least one of: a protected section state of an output of the executed interactive application and an unprotected section state of the output of the executed interactive application;

retiring the interactive application by the broadcast receiver according to the retirement instructions associated with the detected external event and the internal program state of the interactive application;

detecting that a second broadcast receiver installed upstream from the broadcast receiver controlling the interactive application has performed a channel change; and retiring the interactive application according to stored retirement instructions associated with said second broadcast receiver upstream channel change and the internal program state of the interactive application.

2. The method of claim 1, the method further comprising:

detecting that the interactive application is no longer being received on some or all of the transmission bandwidth; and retiring the interactive application according to stored retirement instructions associated with a loss of data pipe and the internal program state of the interactive application.

3. The method of claim 1, the method further comprising:
detecting that the interactive application being transmitted is a different interactive application from the currently executing interactive application; and
retiring the interactive application according to stored retirement instructions associated with a change in the interactive application and the internal program state of the interactive application.

4. The method of claim 1, the method further comprising:
receiving a transmission of a packet of data indicating to retire the interactive application;
decoding the packet of data; and
retiring the interactive application according to the retirement instructions associated with the receipt of the packet of data and the internal program state of the interactive application, the association being defined in the packet of data.

5. The method of claim 1 wherein retiring the interactive application further comprises retiring the interactive application by the broadcast receiver by terminating the execution of the interactive application, in accordance with the retirement instructions associated with the detected external event and the internal program state of the interactive application.

6. The method of claim 1 wherein retiring the interactive application further comprises retiring the interactive application by the broadcast receiver by temporarily suspending the execution of the interactive application, in accordance with the retirement instructions associated with the detected external event and the internal program state of the interactive application.

7. The method of claim 6, the method further comprising:
suspending by the broadcast receiver of the interactive application;
storing by the broadcast receiver a unique identification code for the suspended interactive application;
receiving by the broadcast receiver a packet of data containing the unique identification code for the suspended interactive application, indicating to resume execution of the suspended application; and
resuming by the broadcast receiver execution of the suspended application.

8. The method of claim 1, the method further comprising:
detecting an external event by the broadcast receiver indicating that the execution of the interactive application is no longer appropriate for the television program being displayed;
determining that the interactive application is in the internal program state of protected section, indicating that the interactive application may not be interrupted; and
refraining from retiring the interactive application.

9. The method of claim 8, the method further comprising:
in response to the interactive application being in a protected section, deferring retirement of the interactive application until the interactive application is no longer in a protected section.

10. The method of claim 8, the method further comprising:
determining that the interactive application is in an internal program state of protected section based upon a script command internal to the interactive application.

11. The method of claim 8, the method further comprising:
determining that the interactive application is in an internal program state of protected section based upon a display of an interactive form.

12. The method of claim 8, the method further comprising:
determining that the interactive application is in an internal program state of protected section based upon a viewer selection of an item on an interactive form.

13. The method of claim 1, the method further comprising:
detecting that the transmission of the interactive application is originating from a broadcaster other than the broadcaster which originally transmitted the currently executing interactive application; and
retiring the interactive application according to stored retirement instructions associated with a change in the broadcaster and the program state of the interactive application.

14. The method of claim 1, the method further comprising:
detecting that the transmission of the interactive application is originating from a broadcast server other than the broadcast server associated with the broadcaster which transmitted the currently executing interactive application; and
retiring the interactive application according to stored retirement instructions associated with a change in the broadcast server and the program state of the interactive application.

15. A computer program product for retiring interactive applications associated with television broadcast programs by a broadcast receiver coupled to a display, the computer program product comprising:
program code for receiving by the broadcast receiver an interactive application which is associated with a television program, and which includes a plurality of retirement instructions for retiring the interactive application in response to combinations of external events and internal program states;
program code for executing the interactive application by the broadcast receiver while concurrently displaying the television program;
program code for detecting an external event or condition by the broadcast receiver indicating that the execution of the interactive application is no longer appropriate for the television program being displayed;
program code for detecting an internal program state of the interactive application, wherein the internal program state includes at least one of: a protected section state of an output of the executed interactive application and an unprotected section state of the output of the executed interactive application;
program code for retiring the interactive application by the broadcast receiver according to the retirement instructions associated with the detected external event and the internal program state of the interactive application;
a computer readable medium on which the program codes are stored;
program code for detecting that a second broadcast receiver installed upstream from the broadcast receiver controlling the interactive application has performed a channel change; and
program code for retiring the interactive application according to stored retirement instructions associated with said second broadcast receiver upstream channel change and the internal program state of the interactive application.

16. The computer program product of claim 15, the computer program product further comprising:
program code for detecting that the interactive application is no longer being received on some or all of the transmission bandwidth; and
program code for retiring the interactive application according to stored retirement instructions associated with a loss of data pipe and the internal program state of the interactive application.

17. The computer program product of claim 15, the computer program product further comprising:
program code for detecting that the interactive application being transmitted is a different interactive application from the currently executing interactive application; and
program code for retiring the interactive application according to stored retirement instructions associated with a change in the interactive application and the internal program state of the interactive application.

18. The computer program product of claim 15, the computer program product further comprising:
program code for receiving a transmission of a packet of data indicating to retire the interactive application;
program code for decoding the packet of data; and
program code for retiring the interactive application according to the retirement instructions associated with the receipt of the packet of data and the internal program state of the interactive application, the association being defined in the packet of data.

19. The computer program product of claim 15 wherein the program code for retiring the interactive application includes program code for retiring the interactive application by the broadcast receiver by terminating the execution of the interactive application, in accordance with the retirement instructions associated with the detected external event and the internal program state of the interactive application.

20. The computer program product of claim 15 wherein the program code for retiring the interactive application includes program code for retiring the interactive application by the broadcast receiver by temporarily suspending the execution of the interactive application, in accordance with the retirement instructions associated with the detected external event and the internal program state of the interactive application.

21. The computer program product of claim 20, the computer program product further comprising:
program code for suspending the interactive application;
program code for storing a unique identification code for the suspended interactive application;
program code for receiving a packet of data containing the unique identification code for the suspended interactive application, indicating to resume execution of the suspended application; and
program code for resuming execution of the suspended application.

22. The computer program product of claim 15, the computer program product further comprising:
program code for detecting an external event by the broadcast receiver indicating that the execution of the interactive application is no longer appropriate for the television program being displayed;
program code for determining that the interactive application is in the internal program state of protected section, indicating that the interactive application may not be interrupted; and
program code for refraining from retiring the interactive application.

23. The computer program product of claim 22, the computer program product further comprising:
program code for deferring, in response to the interactive application being in a protected section, retirement of the interactive application until the interactive application is no longer in a protected section.

24. The computer program product of claim 22, the computer program product further comprising:
program code for determining that the interactive application is in an internal program state of protected section based upon a script command internal to the interactive application.

25. The computer program product of claim 22, the computer program product further comprising:
program code for determining that the interactive application is in an internal program state of protected section based upon a display of an interactive form.

26. The computer program product of claim 22, the computer program product further comprising:
program code for determining that the interactive application is in an internal program state of protected section based upon a viewer selection of an item on an interactive form.

27. The computer program product of claim 15, the computer program product further comprising:
program code for detecting that the transmission of the interactive application is originating from a broadcaster other than the broadcaster which originally transmitted the currently executing interactive application; and
program code for retiring the interactive application according to stored retirement instructions associated with a change in the broadcaster and the program state of the interactive application.

28. The computer program product of claim 15, the computer program product further comprising:
program code for detecting that the transmission of the interactive application is originating from a broadcast server other than the broadcast server associated with the broadcaster which originally transmitted the currently executing interactive application; and
program code for retiring the interactive application according to stored retirement instructions associated with a change in the broadcast server and the program state of the interactive application.

* * * * *